United States Patent
Long

(10) Patent No.: US 9,139,240 B1
(45) Date of Patent: Sep. 22, 2015

(54) APPARATUS FOR DECREASING AERODYNAMIC DRAG, IMPROVING STABILITY, AND REDUCING ROAD SPRAY OF A TRANSPORT VEHICLE

(75) Inventor: Jonathan C. Long, Matthews, NC (US)

(73) Assignee: Kodiak Innovations, LLC, Rock Hill, SC (US)

( * ) Notice: Subject to any disclaimer, the term of this patent is extended or adjusted under 35 U.S.C. 154(b) by 307 days.

(21) Appl. No.: 13/350,352

(22) Filed: Jan. 13, 2012

Related U.S. Application Data

(62) Division of application No. 13/209,907, filed on Aug. 15, 2011.

(60) Provisional application No. 61/373,565, filed on Aug. 13, 2010, provisional application No. 61/455,704, filed on Oct. 25, 2010, provisional application No. 61/425,332, filed on Dec. 21, 2010, provisional application No. 61/462,817, filed on Feb. 8, 2011, provisional application No. 61/464,400, filed on Mar. 3, 2011.

(51) Int. Cl.
*B62D 35/02* (2006.01)
*B62D 35/00* (2006.01)

(52) U.S. Cl.
CPC .............. *B62D 35/007* (2013.01); *B62D 35/02* (2013.01)

(58) Field of Classification Search
CPC ..... B62D 35/001; B62D 35/007; B62D 35/02
USPC ............................................ 296/180.4, 180.1
See application file for complete search history.

(56) References Cited

U.S. PATENT DOCUMENTS

| | | | |
|---|---|---|---|
| 2,104,182 | A | 1/1938 | Best |
| 2,605,119 | A | 7/1952 | Earnest |
| 3,869,617 | A | 3/1975 | Gaussoin et al. |
| 3,929,369 | A | 12/1975 | Blair |
| 4,174,653 | A | 11/1979 | Appelblatt |
| 4,262,953 | A | 4/1981 | McErlane |
| 4,386,801 | A | 6/1983 | Chapman et al. |
| 4,418,853 | A | 12/1983 | Shaffer |
| 4,421,354 | A | 12/1983 | Lemaster |

(Continued)

FOREIGN PATENT DOCUMENTS

| | | |
|---|---|---|
| EP | 0030122 A1 | 6/1981 |
| EP | 0121641 A1 | 10/1984 |

(Continued)

OTHER PUBLICATIONS

TMA Aerodynamic Consortium Contract DE-FC26-04NT42117 "Test, Evaluation, and Demonstration of Practical Devices/Systems to Reduce Aerodynamic Drag of Tractor/Semitrailer Combination Unit Trucks," Truck Manufacturers Association, pp. 1-77 (Final Report, Apr. 2007).

*Primary Examiner* — Glenn Dayoan
*Assistant Examiner* — Melissa A Black

(57) ABSTRACT

The invention relates to an apparatus for decreasing aerodynamic drag, improving stability, and reducing road spray of a transport vehicle. The apparatus comprises an underbody fairing comprising a substantially parabolic elongated panel. The underbody fairing is strategically positioned beneath the transport vehicle and forward of the rear wheel assembly to deflect air around the rear wheel assembly while also facilitating a laminar airflow moving laterally beneath the transport vehicle.

28 Claims, 14 Drawing Sheets

(56) References Cited

U.S. PATENT DOCUMENTS

| | | | |
|---|---|---|---|
| 4,486,046 A | 12/1984 | Whitney et al. | |
| 4,611,847 A | 9/1986 | Sullivan | |
| 4,640,541 A | 2/1987 | FitzGerald et al. | |
| 4,746,160 A | 5/1988 | Wiesemeyer | |
| 4,976,489 A * | 12/1990 | Lovelace | 296/180.1 |
| 4,991,906 A | 2/1991 | Fingerle | |
| 5,280,990 A * | 1/1994 | Rinard | 296/180.1 |
| 5,538,315 A | 7/1996 | Dixon | |
| D395,848 S | 7/1998 | Meryman et al. | |
| 5,788,321 A | 8/1998 | McHorse et al. | |
| 5,921,617 A | 7/1999 | Loewen et al. | |
| 6,109,639 A | 8/2000 | Blassingame et al. | |
| 6,361,061 B1 | 3/2002 | Lea | |
| 6,644,720 B2 | 11/2003 | Long et al. | |
| 6,685,256 B1 | 2/2004 | Shermer | |
| 6,974,178 B2 | 12/2005 | Ortega et al. | |
| 7,093,889 B2 | 8/2006 | Graham | |
| D531,948 S | 11/2006 | Angelo et al. | |
| 7,163,258 B2 | 1/2007 | Dyer, II et al. | |
| 7,240,958 B2 | 7/2007 | Skopic | |
| 7,399,136 B2 | 7/2008 | Petrie et al. | |
| 7,497,502 B2 | 3/2009 | Wood | |
| 7,604,284 B2 | 10/2009 | Reiman et al. | |
| 7,641,262 B2 | 1/2010 | Nusbaum | |
| 7,740,303 B2 | 6/2010 | Wood | |
| 7,762,615 B2 | 7/2010 | Dayton | |
| 7,806,464 B2 * | 10/2010 | Cardolle | 296/180.4 |
| 7,828,368 B2 | 11/2010 | Ortega et al. | |
| 8,007,030 B2 | 8/2011 | Wood | |
| 8,322,778 B1 * | 12/2012 | Pfaff | 296/180.4 |
| 2001/0013693 A1 | 8/2001 | Ross et al. | |
| 2001/0033095 A1 | 10/2001 | Scott | |
| 2002/0050413 A1 | 5/2002 | Renault | |
| 2004/0080185 A1 | 4/2004 | Loddo | |
| 2004/0256884 A1 | 12/2004 | Schwartz | |
| 2005/0051991 A1 | 3/2005 | Saxon et al. | |
| 2005/0116508 A1 | 6/2005 | Sebastian | |
| 2006/0157952 A1 | 7/2006 | Bonnaud et al. | |
| 2006/0181048 A1 | 8/2006 | Stowell et al. | |
| 2006/0214474 A1 | 9/2006 | Omiya et al. | |
| 2006/0232102 A1 | 10/2006 | Steel | |
| 2007/0120397 A1 | 5/2007 | Layfield et al. | |
| 2008/0296930 A1 | 12/2008 | Roush et al. | |

FOREIGN PATENT DOCUMENTS

| | | |
|---|---|---|
| EP | 1190937 A1 | 3/2002 |
| EP | 1870321 B1 | 12/2007 |
| EP | 1870322 B1 | 12/2007 |
| SU | 1650510 A1 | 5/1991 |
| WO | 2006/115988 A2 | 11/2006 |
| WO | 2009/123478 A1 | 10/2009 |

* cited by examiner

APPARATUS FOR DECREASING AERODYNAMIC DRAG, IMPROVING STABILITY, AND REDUCING ROAD SPRAY OF A TRANSPORT VEHICLE

CROSS-REFERENCE TO PRIORITY APPLICATIONS

This is a divisional application of and claims the benefit of priority and incorporates by reference prior application Ser. No. 13/209,907 filed on Aug. 15, 2011, which claims the benefit of, and incorporates entirely by reference, commonly owned U.S. Provisional Patent Application Ser. No. 61/373,565, for Apparatus and System for Reducing Drag and Increasing Stability of a Transport Vehicle, filed on Aug. 13, 2010; Ser. No. 61/455,704, for System and Method for Mounting Structural Add-ons for Heavy Duty Vehicles, filed on Oct. 25, 2010; Ser. No. 61/425,332, for Apparatus and System for Reducing Drag and Increasing Stability of a Transport Vehicle, filed on Dec. 21, 2010; Ser. No. 61/462,817, for System and Method for Mounting Structural Add-ons for Heavy Duty Vehicles, filed on Feb. 8, 2011; and Ser. No. 61/464,400, for System and Method for Improving Vehicle Aerodynamics and Fuel Efficiency, filed on Mar. 3, 2011.

FIELD OF THE INVENTION

The invention relates generally to land vehicles with distinct wind deflectors. More particularly, the invention relates to an apparatus for decreasing aerodynamic drag, improving stability, and reducing road spray of a transport vehicle and a method of mounting an aerodynamic add-on device 139 onto a transport vehicle.

BACKGROUND OF THE INVENTION

Because fuel costs represent a significant percentage of the overall cost of transporting cargo via a transport vehicle (e.g., tractor-trailers, semi-trailers, semis, over-the-road trucks, delivery trucks, straight trucks, box trucks, large good vehicles, railcars), businesses have an interest in reducing the amount of fuel consumed by their transport vehicles. It is well known that transport vehicles in motion experience a significant amount of aerodynamic drag (i.e., drag). This aerodynamic drag greatly reduces fuel efficiency, leads to increased fuel consumption, and increases the cost of transporting items.

When considering methods of reducing aerodynamic drag on a transport vehicle, the various effects of crosswind are of particular importance. When the movement of a transport vehicle is at a velocity significantly greater than the wind speed, air strikes the transport vehicle from the front. Crosswind conditions exist when a significant wind force is exerted on the transport vehicle from a direction other than the transport vehicle's line of travel. Such crosswind typically attacks the transport vehicle at an angle between about 1 degree and 12 degrees (e.g., about 6 degrees) relative to the direction of travel of the transport vehicle.

Crosswind has a significantly greater effect on transport vehicles in motion than it has on smaller vehicles (e.g., passenger automobiles). One reason that crosswind influences transport vehicles more is that such vehicles typically have a substantially larger gap between their front wheel assembly and their rear wheel assembly than do smaller vehicles. This large gap provides more space for crosswind to pass beneath the transport vehicle (i.e., in the space between the front and rear wheel assemblies, and between the bottom of the transport vehicle and the supporting surface (e.g., the road)).

As a transport vehicle moves through crosswind, an area of high pressure forms on the upwind side of the transport vehicle, and an area of low pressure forms on the downwind side of the transport vehicle. The airflow moves from the upwind area of high pressure, underneath and between the wheel assemblies of the transport vehicle, and then into the downwind area of low pressure on the opposite side of the transport vehicle. As the airflow enters the area of low pressure on the opposite side of the transport vehicle, it become turbulent, creates drag and reduces fuel efficiency. Turbulent air can also contribute to an increase in road spray (i.e., water or snow sprayed into the air by the wheels). Road spray can be annoying or dangerous to surrounding motorists because it tends to interfere with visibility.

Previous attempts to deal with airflow passing underneath a transport vehicle have focused on either preventing air from passing underneath the transport vehicle altogether, or deflecting air around the rear wheel assembly. There are various types of aerodynamic add-on devices employed for these purposes to varying degrees of success. Some examples of aerodynamic add-on devices include side skirts, end skirts, trailer forebody and aftbody plates, side enclosures, side extenders, vertical plates and air deflectors used at the tractor-trailer gap, belly boxes, air dams and other under-mounted or underside air management structures. Such aerodynamic add-on devices are often positioned on the bottom (i.e., undercarriage, underbody) of the transport vehicle and immediately forward of the rear wheel assembly in an effort to reduce the significant drag created by the rear wheel assembly. Such devices are generally effective at reducing the aerodynamic drag.

But to be truly effective, the aerodynamic device must account for the positive and negative influences on the transport vehicle of crosswind. A positive aspect of this crosswind is that as the air rushes underneath the transport vehicle from the side, it creates a low pressure area underneath the transport vehicle. This area of low pressure underneath the transport vehicle is desirable because it generates downforce on the transport vehicle. Greater downforce generally creates greater stability. A negative aspect of this crosswind airflow is that when the airflow reaches the area of low pressure on the downwind side of the transport vehicle, it becomes turbulent and creates aerodynamic drag. The turbulence also can cause the transport vehicle to become unstable due to buffeting. This instability can be both unsafe and fatiguing for the operator of the transport vehicle.

Some of the aforementioned aerodynamic add-on devices do not address the unique problems associated with the aerodynamic forces that crosswind exerts on a moving transport vehicle. Others have recognized the impact of crosswind, but have sought to address the issue by inhibiting the lateral flow of crosswind underneath the transport vehicle (e.g., by the use of skirts (i.e., trailer side skirts, side fairings)). The design characteristics of some devices may work in non-crosswind conditions, but those same design characteristics may actually contribute to aerodynamic drag and instability in crosswind. By inhibiting the lateral flow of crosswind beneath the transport vehicle, these devices potentially decrease stability and increase tipping forces (e.g., forces caused by crosswind having a tendency to tip over the transport vehicle), thereby resulting in danger to the operator of the transport vehicle as well as nearby motorists.

Furthermore, many transport vehicles are equipped with a rear bumper bar (e.g., a rear safety bumper (i.e., an ICC bumper). An ICC bumper, for example, is a rear bumper bar typically made out of 3-inch to 4-inch steel channel stock, suspended about half the distance from the bottom of the transport vehicle to the supporting surface. Although the rear bumper bar serves an important function of preventing under-ride collisions, it also creates aerodynamic drag by interfering with the smooth, organized (i.e., laminar) flow of air underneath and around the transport vehicle. The resulting aerodynamic drag decreases the fuel efficiency of the transport vehicle. In addition, existing rear bumper bars do nothing to help mitigate the drag resulting from turbulent airflow at the rear portion of a transport vehicle.

As discussed, a variety of aerodynamic add-on device have been developed to improve the aerodynamics of transport vehicles. Many of these devices are bulky and difficult for just one person to install. Installation can be further complicated by the fact that certain materials used to make these aerodynamic devices can contract and expand quite significantly in extreme temperatures. The installation methods currently employed (e.g., bolting or riveting the aerodynamic device in place) generally inhibit the ability of the aerodynamic device to expand and/or contract. As a result, such installation methods necessitate the use of materials which tend to not expand or contract, which materials are generally more expensive and heavier than alternative materials.

Accordingly, there exists a need for an improved apparatus capable of reducing aerodynamic drag resulting from a transport vehicle moving in crosswind, while increasing the stability and handling of the transport vehicle and reducing road spray. Furthermore, there exists a need for an apparatus that promotes the conversion of turbulent airflow to laminar airflow at the rear portion of a transport vehicle. There also exists a need for a system and method for installing an aerodynamic add-on device that is easier for one person to perform, and that allows for the expansion and contraction of the aerodynamic device in extreme temperatures, thereby permitting the use of lighter and less expensive materials in the manufacture of the aerodynamic device.

BRIEF SUMMARY OF THE INVENTION

It is an object of the present invention to provide an apparatus that minimizes aerodynamic drag on a transport vehicle.

It is yet another object of the present invention to provide an apparatus that minimizes air turbulence caused by the flow of air beneath a transport vehicle.

It is yet a further object of the present invention to provide an apparatus that minimizes aerodynamic drag while also allowing for the laminar flow of crosswind across the underside of a transport vehicle.

It is yet a further object of the present invention to provide an apparatus that improves the handling of a transport vehicle.

It is yet a further object of the present invention to provide an apparatus that improves the stability and safety of a transport vehicle.

It is yet a further object of the present invention to provide an apparatus that reduces road spray from a transport vehicle operated in wet or snowy conditions.

It is yet a further object of the present invention to provide an apparatus that improves the aerodynamic, handling, and stability features of a transport vehicle and that can be produced efficiently and in a cost-effective manner.

It is yet a further object of the present invention to provide an apparatus that improves the aerodynamic, handling, and stability features of a transport vehicle and that can be easily installed on a transport vehicle.

It is yet a further object of the present invention to provide an apparatus that reduces aerodynamic drag, increases stability, and reduces road spray of a transport vehicle and that minimizes damage from road obstacles.

It is yet a further object of the present invention to provide an apparatus that minimizes aerodynamic drag on the rear bumper bar of a transport vehicle.

It is still another object of the present invention to provide an apparatus that converts turbulent airflow to laminar airflow at the rear portion of a transport vehicle.

It is yet another object of the present invention to provide an apparatus for mounting an aerodynamic add-on device to a transport vehicle.

It is yet another object of the present invention to provide an efficient method of mounting an aerodynamic add-on device onto a transport vehicle.

It is yet another object of the present invention to provide a method of mounting an aerodynamic add-on device onto a transport vehicle that allows for the use of lighter, more cost effective materials in the manufacture of the aerodynamic add-on device.

It is still another object of the present invention to provide a side marker lamp capable of illuminating an aerodynamic add-on device mounted to the underbody of a transport vehicle.

It is yet another object of the present invention to provide a method of verifying the inspection of aerodynamic add-on devices mounted onto a transport vehicle.

It is yet another object of the present invention to provide a system for monitoring the integrity of the connection between an aerodynamic add-on device having a mounting means and a transport vehicle.

The foregoing, as well as other objectives and advantages of the invention, and the manner in which the same are accomplished, are further specified within the following detailed description and its accompanying drawings.

According to the present invention, the foregoing and other object and advantages are attained by an apparatus for decreasing aerodynamic drag, improving stability, and decreasing road spray of a transport vehicle comprising an underbody fairing for mounting to a bottom portion of a transport trailer forward of the rear wheel assembly, the underbody fairing comprising a substantially parabolic elongated panel having a first edge portion, a second edge portion, a first lateral portion and a second lateral portion, and a vertex portion, the vertex portion being substantially arcuate, whereby the underbody fairing diverts airflow around the rear wheel assembly of the transport vehicle while facilitating the laminar flow of crosswind beneath the transport vehicle, thereby decreasing aerodynamic drag, improving stability, and decreasing road spray of the transport vehicle.

In a preferred embodiment, the vertex portion defines a portion of a circle having a radius equal in length to a specified percentage of the width of the transport vehicle. Preferably, the underbody fairing is positioned substantially perpendicular to the bottom of the transport vehicle.

In a preferred embodiment, the underbody fairing has a horizontal length equal to a specified percentage of the inside wheelbase of the transport vehicle. Preferably, the specified percentage is between 25 percent and 65 percent.

In a preferred embodiment, the substantially parabolic elongated panel has a substantially resilient lower portion.

In another aspect, the invention embraces an apparatus for decreasing aerodynamic drag, improving stability, and decreasing road spray of a transport vehicle having a rear bumper bar comprising an air straightener for promoting the laminar flow of air over the surfaces of a rear bumper bar, wherein the air straightener is adapted to extend forward from the front of the rear bumper bar a distance equal to between one and three times the horizontal width of the rear bumper bar, whereby the extended width of the air straightener allows for an improved ability to convert the turbulent airflow approaching the front of the rear bumper bar into a laminar airflow exiting the rear portion of the transport vehicle, thereby decreasing aerodynamic drag, improving stability, and decreasing road spray.

In another aspect, the invention embraces an apparatus for decreasing aerodynamic drag, improving stability, and decreasing road spray of a transport vehicle comprising at least one front flap attached to the bottom portion of the transport vehicle forward of the rear wheel assembly, and at least one rear flap attached to the bottom portion of the transport vehicle rearward of the rear wheel assembly, wherein the at least one front flap is adapted to deflect rearward under wind loads experienced at highway speeds, thereby forcing airflow downward and between the axles of the rear wheel assembly and the ground, and wherein the at least one rear flap is adapted to deflect rearward under wind loads experienced at highway speeds, thereby forcing airflow exiting beneath the axles of the rear wheel assembly downward and out the rear portion of the transport vehicle, whereby the at least one front flap and the at least one rear flap work in combination to maintain a channel of accelerated airflow beneath the rear portion of the transport vehicle, thereby reducing aerodynamic drag, increasing stability and reducing road spray of the transport vehicle.

In yet another aspect, the invention embraces an apparatus for mounting an aerodynamic add-on device to a transport vehicle comprising a first support post for mounting to the bottom portion of the transport vehicle, a second support post for mounting to the bottom portion of the transport vehicle, at least one support cable for mounting to the aerodynamic add-on device, the at least one support cable secured at one end to the first support post and at another end to the second support post, and at least one quick-connect post for mounting both to the at least one support cable and to the transport vehicle, whereby the apparatus facilitates the installation of the aerodynamic add-on device by one person and allows for the use of lighter, more cost-effective materials in the manufacture of the aerodynamic add-on device.

In still another aspect, the invention embraces a method of mounting an aerodynamic add-on device onto a transport vehicle, the method comprising the steps of attaching a first support post to the transport vehicle, attaching a second support post to the transport vehicle, securing at least one support cable to a side of the aerodynamic add-on device, securing at least one quick-connect post to the at least one support cable or alternatively to a side of the aerodynamic add-on device, said at least one quick-connect post being positioned in a middle portion of the side of the aerodynamic device and substantially perpendicular to a longitudinal axis of the aerodynamic add-on device, securing one end of the at least one quick-connect post to the transport vehicle, securing one end of the at least one support cable to said first support post, and attaching an opposite end of the at least one support cable to the second support post, wherein the method of installing an aerodynamic add-on device onto a transport vehicle facilitates installation by one person because the middle portion of the aerodynamic add-on device is supported during the installation process by at least said first quick-connect post.

In still another aspect, the invention embraces a side marker lamp for illuminating an aerodynamic add-on device mounted on the underbody of a transport vehicle, comprising a rigid housing for attachment to a side portion of the transport vehicle, the rigid housing having a first side and a second side, the second side opposing the first side, a light source positioned inside the housing, a first lens attached to the first side of said housing, the first lens configured to receive light from the light source and project the light away from the transport vehicle, and a second lens attached to the second side of said housing, the second lens configured to receive light from the light source and project the light underneath the transport vehicle, whereby the side marker lamp, when attached to a side portion of a transport vehicle, facilitates the illumination of the aerodynamic device mounted on the underbody of the transport vehicle while simultaneously marking the side portion of the transport vehicle.

In yet another aspect, the invention embraces a method of verifying inspection of the aerodynamic add-on devices mounted onto a transport vehicle, the method comprising the steps of attaching a radio frequency identification tag to each aerodynamic add-on device to be inspected, inspecting the transport vehicle while equipped with a mobile radio frequency device reader, the mobile radio frequency device reader being adapted to first detect when the mobile radio frequency device reader is within inspection range of the radio frequency identification tag of each aerodynamic add-on device to be inspected and then generate a log of the time and date when the detection occurred, and reviewing the mobile radio frequency device reader log to verify that each aerodynamic add-on device 139 was inspected.

In still another aspect, the invention embraces a system for monitoring the integrity of the connection between an aerodynamic add-on device having a mounting means and a transport vehicle comprising an electronic monitoring device having a power source, a ground wire connected at one end to said electronic monitoring device and at an opposite end to the mounting means, a warning indicator for alerting the transport vehicle operator that said electronic monitoring device has detected a disconnection of the mounting means of the aerodynamic add-on device from the transport vehicle, and a transmission means for transmitting an alarm signal from the electronic monitoring device to the warning indicator.

DETAILED DESCRIPTION

Figure 1:
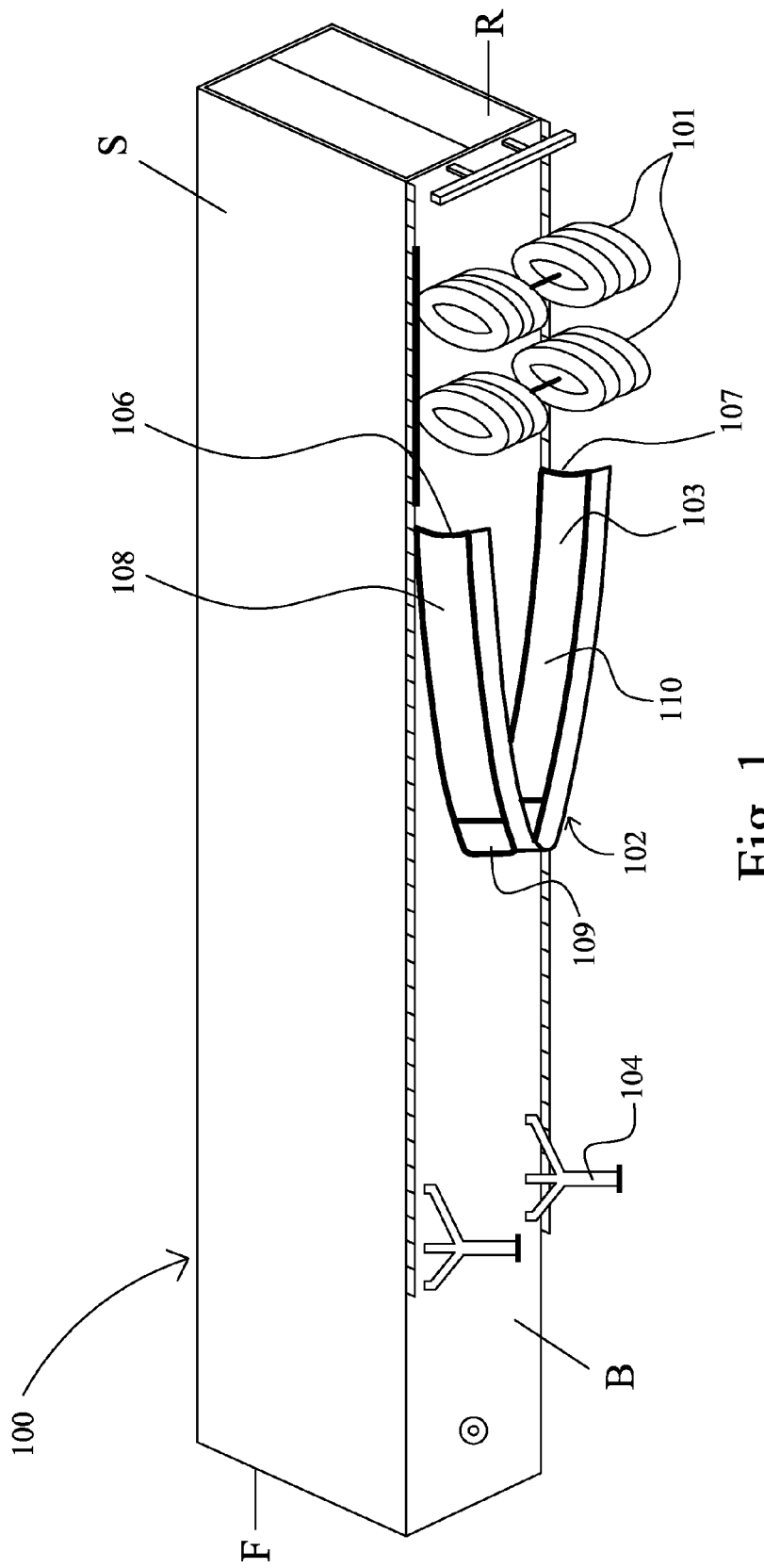
FIG. 1 is a bottom perspective view depicting the trailer portion of an exemplary transport vehicle fitted with an exemplary apparatus for decreasing aerodynamic drag, improving stability, and reducing road spray of a transport vehicle according to the present invention.
Figure 2:
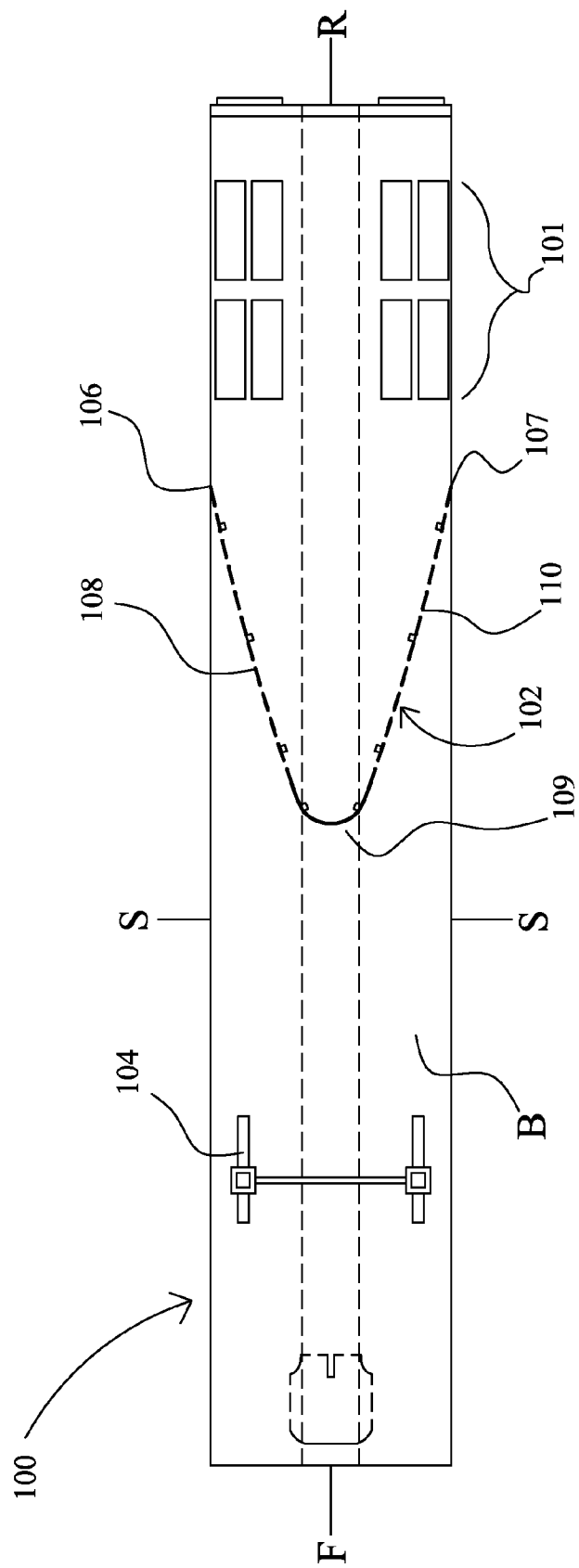
FIG. 2 is a bottom elevation view depicting the trailer portion of an exemplary transport vehicle fitted with an exemplary apparatus for decreasing aerodynamic drag, improving stability, and reducing road spray of a transport vehicle according to the present invention.
Figure 3:
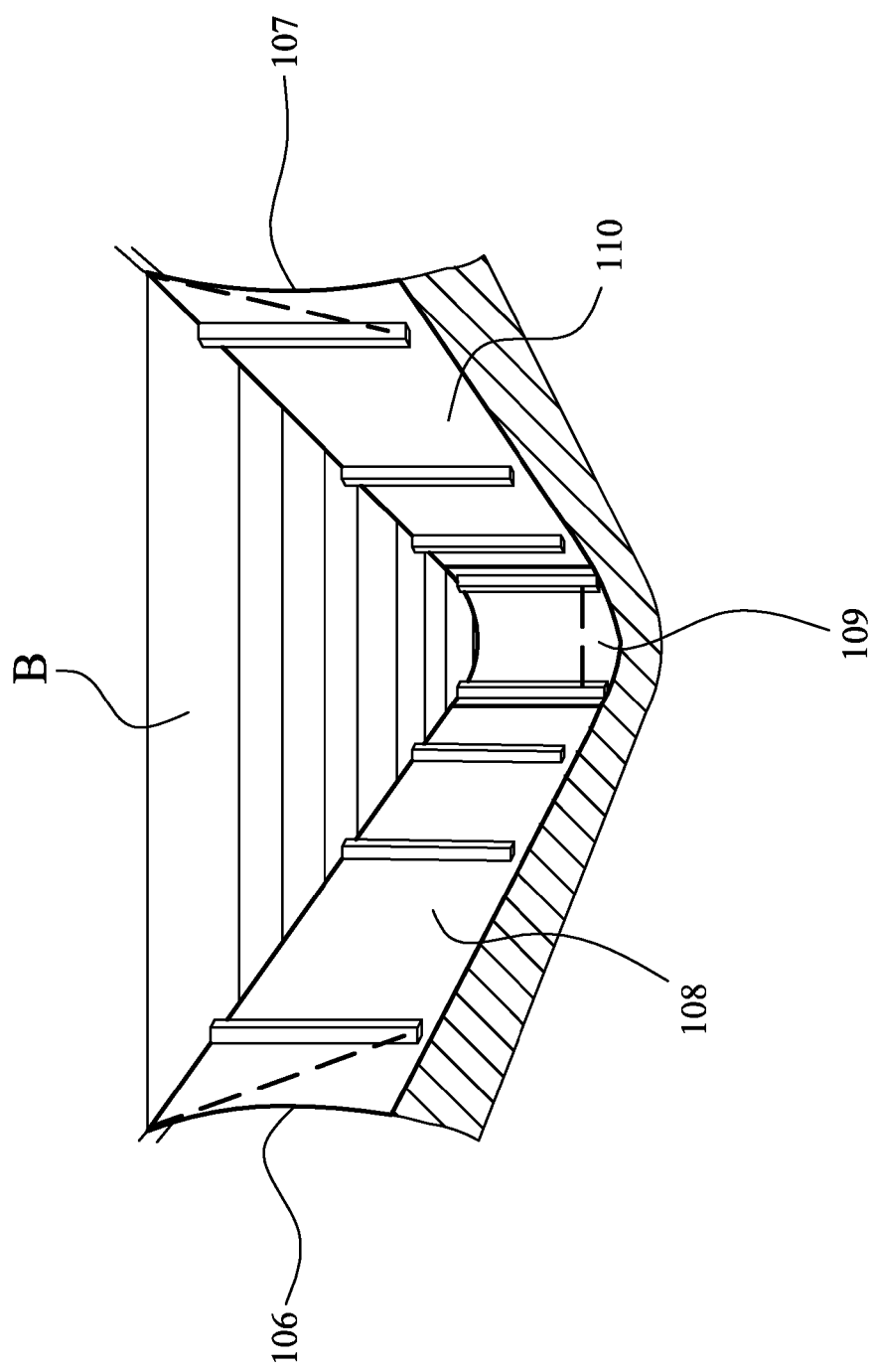
FIG. 3 is a rear perspective view of an exemplary apparatus for decreasing aerodynamic drag, improving stability, and reducing road spray of a transport vehicle according to the present invention.

The apparatus and method according to the present invention will typically be used in connection with transport vehicles having a front F, a rear R, a bottom B (i.e., underbody, undercarriage, underside), and opposing sides S. The transport vehicle typically has at least one front wheel assembly (i.e., a wheel assembly (i.e., combination of an axle, rims and tires) positioned near the front portion of the transport vehicle and substantially supporting the front portion of the transport vehicle) and at least one rear wheel assembly (i.e., a wheel assembly positioned near the rear portion of the transport vehicle and substantially supporting the rear portion of the transport vehicle). The rearmost front wheel assembly is that front wheel assembly which is nearest the rear of the transport vehicle. The frontmost rear wheel assembly is that rear wheel assembly which is nearest the front of the transport vehicle. The inside wheelbase is the distance from the most rearward axle of the rearmost front wheel assembly to the most forward axle of the frontmost rear wheel assembly when the frontmost rear wheel assembly is in its most forward position. It will be understood by a person of ordinary skill in the art that certain transport vehicles have rear wheel assemblies capable of repositioning (i.e., sliding tandem, bogies or sliding transport bogies).

For purposes of the illustrations and description of the present invention, a box-type tractor-trailer (i.e., a combination of a road truck and box semi-trailer) is used as an exemplary transport vehicle. It should be understood that the apparatus and system according to the present invention may be employed with other types of transport vehicles, including other types of tractor-trailers (e.g., flatbeds, tankers, car-haulers).

Referring now to FIGS. 1 through 5, to decrease aerodynamic drag, improve stability, and decrease road spray of a transport vehicle 100, an apparatus according to the present invention comprises an underbody fairing 102 for mounting to a bottom portion of a transport vehicle forward of the rear wheel assembly 101. The underbody fairing 102 comprises a substantially parabolic elongated panel 103 having a first edge portion 106, a second edge portion 107, a first lateral portion 108 and a second lateral portion 110, and a vertex portion 109. The first lateral portion 108 comprises the portion between the vertex portion 109 and the first edge portion 106. The second lateral portion 110 comprises the portion between the vertex portion 109 and the second edge portion 107.

The use of the term "parabolic" in the disclosure is intended to provide a description of the general shape (i.e., the shape as viewed from a bottom elevational view) of the elongated panel 103, and should not be construed as limiting this aspect of the disclosure to the strict geometric definition of a parabola. In particular, it should be understood that a preferred embodiment the apparatus according to the present invention features a substantially straight first lateral portion 108 and a substantially straight second lateral portion 110.

The vertex portion 109 is substantially arcuate. The substantially arcuate shape of the vertex portion 109 facilitates the laminar flow of crosswind beneath the transport vehicle 100, thereby decreasing aerodynamic drag, improving stability, and decreasing road spray of the transport vehicle 100.

Figure 4:
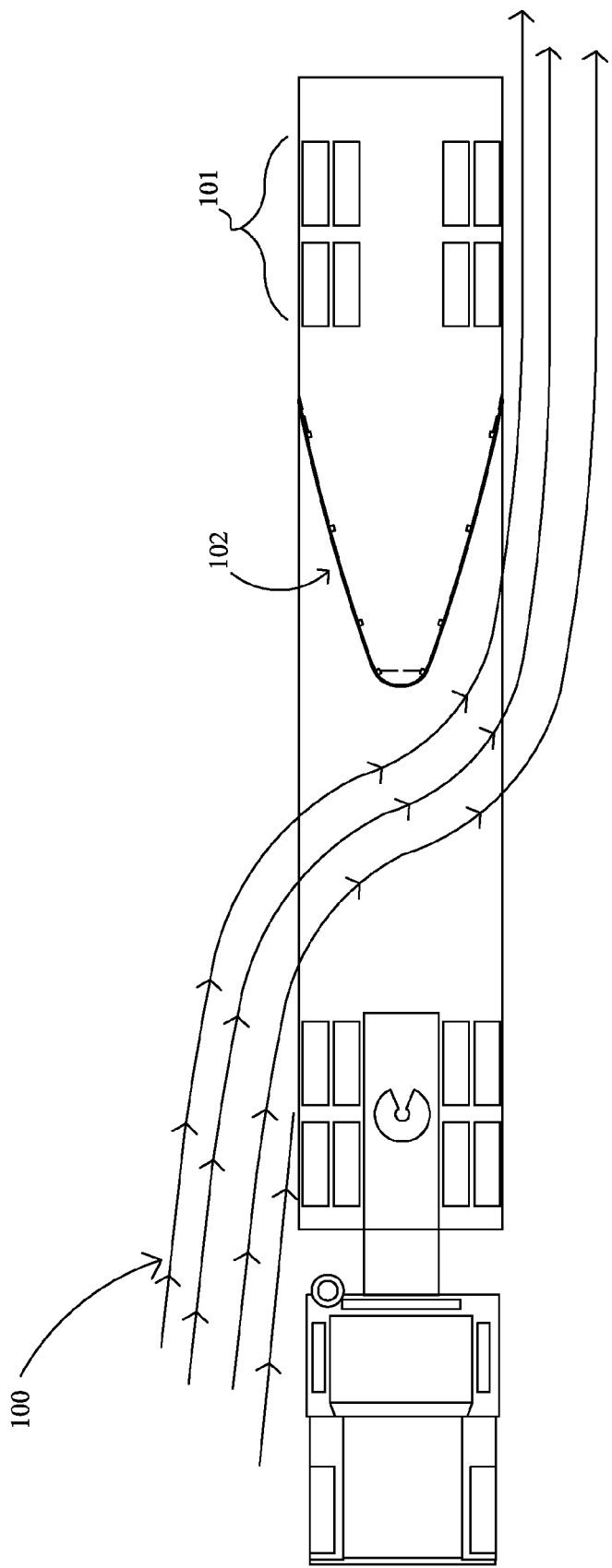
FIG. 4 is a bottom elevation view depicting an exemplary transport vehicle fitted with an exemplary apparatus for decreasing aerodynamic drag, improving stability, and reducing road spray of a transport vehicle according to the present invention, and further depicting the flow of crosswind.
Figure 5:
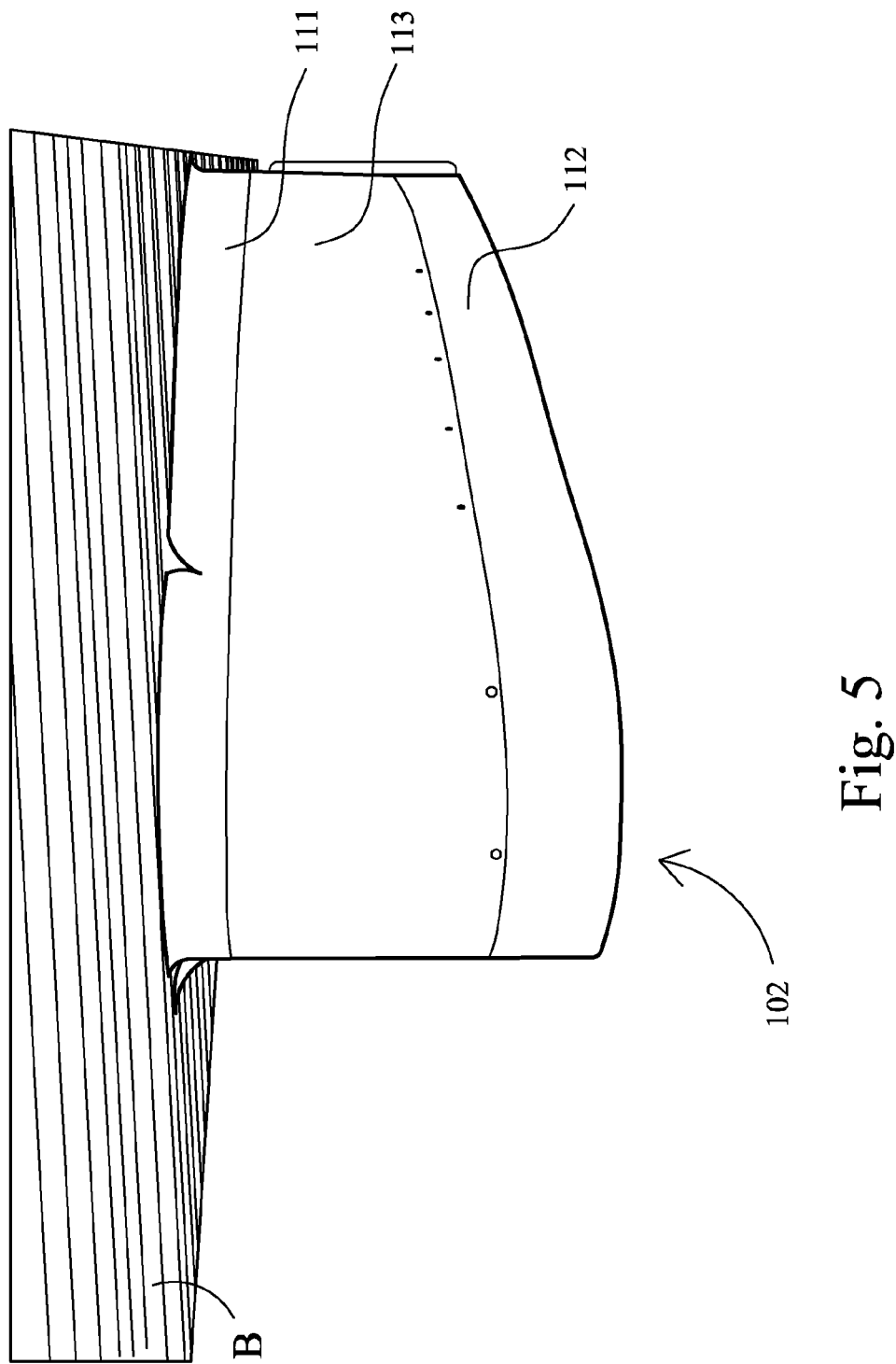
FIG. 5 is a side perspective view depicting an exemplary apparatus for decreasing aerodynamic drag, improving stability, and reducing road spray of a transport vehicle according to the present invention.

In this way, the vertex portion 109 resembles the leading edge of a symmetrical airfoil. In particular, as crosswind passes underneath the transport vehicle 100, the arcuate design of the vertex portion 109 facilitates a laminar airflow around the vertex portion 109 to the downwind side, and past the rear R. By employing this airfoil-like design, the apparatus according to the present invention substantially limits the amount of turbulence on the downwind side. In this regard, the vertex portion 109 should be substantially free of any protrusions or gaps which would disrupt the laminar airflow across the vertex portion 109. FIG. 4 depicts how the underbody fairing 102 according to the present invention facilitates a laminar airflow beneath the transport vehicle 100 and through to the downwind side of the transport vehicle 100.

It will be appreciated that to the extent that prior art devices have encouraged the use of a substantially angular equivalent of a vertex portion for a similar underbody fairing, these devices have actually taught away from the airfoil-like design of the present invention. More particularly, an angular vertex portion would have a tendency to disrupt the lateral flow of air beneath the transport vehicle, causing undesirable turbulence and aerodynamic drag. This may cause this lateral airflow to separate from the downwind surface of the underbody fairing, further reducing the effectiveness of the apparatus. A person of ordinary skill in the art will appreciate that this effect caused by an angular vertex portion is similar to an aerodynamic stall of an airfoil, wherein the laminar flow of air over the surfaces of the airfoil is disrupted and made turbulent.

In a preferred embodiment, the vertex portion 109 defines a portion of a circle having a radius equal in length to a specified percentage of the width (i.e., horizontal distance from one side S to an opposite side S) of the transport vehicle 100. The specified percentage will generally be between 5 percent and 25 percent. Typically, the specified percentage will be between 10 percent and 20 percent. More typically, the specified percentage will be between 14 percent and 18 percent (e.g., 16 percent).

In a preferred embodiment, the first lateral portion 108 and the second lateral portion 110 of the substantially elongated panel 103 are substantially straight. Alternatively, the first lateral portion 108 and the second lateral portion 110 of the substantially elongated panel 103 are substantially arcuate.

In a preferred embodiment, the underbody fairing 102 is positioned substantially perpendicular to the bottom of the transport vehicle 100. The ratio of the vertical height of the underbody fairing 102 to the distance between the bottom of the trailer and the ground affects the aerodynamic performance of the apparatus according to the present invention. In particular, in a preferred aspect, the underbody fairing 102 extends from the bottom of the transport vehicle 100 a vertical distance that is a specified percentage of the distance from the bottom of the transport vehicle 100 to the ground. Typically, the specified percentage is between 65 percent and 85 percent. More typically, the specified percentage is between 70 percent and 80 percent (e.g., 77 percent).

Similarly, the horizontal length of the underbody fairing 102 affects its performance. The underbody fairing 102 should not be so long as to substantially inhibit air from flowing laterally across the bottom B of the transport vehicle 100. The horizontal length of the underbody fairing 102 is defined as the distance between the forwardmost point of the vertex portion 109 and a point that is midway between the first edge portion 106 and the second edge portion 107 of the substantially parabolic elongated panel 103. In a preferred embodiment of the apparatus according to the present invention, the horizontal length of the underbody fairing 102 is equal to a specified percentage of the inside wheelbase of the transport vehicle 100. Typically, the specified percentage is between 18 percent and 58 percent. More typically, the specified percentage is between 28 percent and 48 percent (e.g., about 38 percent).

The horizontal length of the underbody fairing 102 impacts the behavior of airflow moving laterally beneath the transport vehicle. More particularly, a relatively longer underbody fairing (i.e., relative to the length of the inside wheelbase) provides sufficient surface area on the downwind side for the airflow to become and remain laminar. If the horizontal length is too short, the airflow moving laterally beneath the transport vehicles will not have sufficient guidance and time to organize into a laminar airflow on the downwind side of the transport vehicle. This may result in an excessively turbulent airflow forward of the underbody fairing as well. In addition, it will be appreciated that by employing a relatively greater horizontal length for the underbody fairing, the horizontal space (i.e., gap) between the front wheel assembly and the underbody fairing is decreased. When crosswind enters this relatively smaller gap, the velocity of the airflow increases, resulting in a decrease in air pressure. The decreased air pressure provides downforce on the transport vehicle, creating greater stability. If the horizontal length of the underbody fairing is too great, however, it will prevent a sufficient amount of air from flowing beneath the trailer to achieve this desired downforce. Furthermore, an underbody fairing with an excessively long horizontal length would require the use of more construction materials, resulting in greater cost and increased weight.

By virtue of its placement beneath the undercarriage of the transport vehicle 100, the underbody fairing 102 according to the present invention is potentially subject to impact with roadway obstacles (e.g., hills, road humps, curbs, railroad crossings, debris). To avoid or minimize damage caused from such impact, the underbody fairing 102 may be, at least in part, comprised of a substantially resilient material. In a preferred embodiment, the underbody fairing's 102 substantially parabolic elongated panel 103 has a substantially resilient lower portion 112. This substantially resilient lower portion 112 is capable of flexing upon contact with an obstacle, and then returning to its original aerodynamic shape, thereby preventing damage to the underbody fairing 102.

To prevent airflow from streaming between the top of the underbody fairing 102 and the bottom B of the transport vehicle 100, which airflow could inhibit the drag-reducing effects of the underbody fairing 102, a preferred embodiment of the apparatus according to the present invention comprises a substantially parabolic elongated panel 103 having a substantially resilient upper portion 111. When the underbody fairing 102 is positioned for mounting beneath the transport vehicle 100, the substantially resilient upper portion 111 deflects horizontally along the bottom B of the transport vehicle 100. As a result, the substantially resilient upper portion 111 forms a barrier substantially preventing airflow from streaming over the top of the underbody fairing 102, thereby preserving the drag-reducing properties of the underbody fairing 102. The substantially resilient upper portion 111 and substantially resilient lower portion 112 may be attached to or integral to the substantially parabolic elongated panel 103.

It will be apparent to one of ordinary skill in the art that constructing the underbody fairing 102, at least in part, out of resilient materials allows for the use of materials that are more cost effective, lighter, and easier to transport (e.g., can be laid flat for transport). To maintain the appropriate aerodynamic shape of the underbody fairing 102, however, it will generally be necessary to construct at least part of it out of substantially rigid materials (e.g., fiberglass reinforced plastic). In a preferred embodiment, the substantially parabolic elongated panel 103 has a substantially rigid middle portion 113 that allows the underbody fairing 102 to maintain its aerodynamic shape when encountering aerodynamic forces generated while the transport vehicle 100 is traveling at highway speeds (e.g., speeds in excess of 45 miles per hour).

When a transport vehicle 100 equipped with an apparatus according to the present invention is operated in icy conditions (e.g., in a snowstorm), there exists the possibility that ice will build up on the underbody fairing 102. Ice buildup is undesirable because it adds weight to the transport vehicle 100 and can diminish the drag-reducing properties of the underbody fairing 102. To prevent ice from accumulating, an alternative embodiment of the apparatus according to the present invention includes a means for heating the surface of the underbody fairing 102. For example, one or more heating elements may be attached to the surface of the underbody fairing 102. The heating elements may be connected to the electrical system of the transport vehicle 100. Alternatively, the means of heating the surface of the underbody fairing 102 may be engine exhaust gases. These exhaust gases may be collected and distributed via a ducted system which distributes the heat from the gases to the underbody fairing 102. The heating means may be activated by the operator of the transport vehicle 100, or it may activate automatically in below-freezing temperatures.

The positioning of the underbody fairing 102 in relation to the transport vehicle 100 to which it is mounted affects the performance of the apparatus according to the present invention. In a preferred embodiment, the underbody fairing 102 is attached (e.g., mountably attached or slidably attached) to the bottom B of the transport vehicle 100 using a suitable attachment means (e.g., brackets, frames, bolts, rivets, connecting rods, cables and/or support posts). In a preferred embodiment, the underbody fairing 102 is slidably attached to the bottom B of the transport vehicle 100 to allow adjustments in positioning (e.g., to adjust its position when the rear wheel assembly 101 is repositioned by means of a sliding trailer bogie).

In a preferred embodiment, the underbody fairing 102 is positioned adjacent to the bottom B of the transport vehicle 100 with the vertex portion 109 being positioned adjacent to the bottom of the transport vehicle 100 and substantially along a longitudinal centerline of the transport vehicle 100 and forward of the first edge portion 106 and the second edge portion 107. The first edge portion 106 is positioned substantially adjacent to an intersection of the bottom of the transport vehicle 100 and one side of the transport vehicle 100. The second edge portion 107 is positioned substantially adjacent to an intersection of the bottom of the transport vehicle 100 and an opposite side of the transport vehicle 100. The first edge portion 106 and said edge portion may each also be positioned substantially adjacent to the front portion of the rear wheel assembly 101.

In an alternative embodiment, the first edge portion 106 and the second edge portion 107 are each further positioned a horizontal distance from the most forward axle 115 of the rear wheel assembly 101. The positioning of the edge portions in this manner provides a sufficient gap between the back portion of the underbody fairing 102 and the rear wheel assembly 101 to allow the desired amount of turbulent air to exhaust from behind the underbody fairing, and to allow for easy access to the area behind the underbody fairing for purposes of maintenance or access to items located behind the underbody fairing (e.g., spare tire, spare tire rack, truck chains, loading ramps, etc.). In a preferred embodiment, this horizontal distance is equal to a specified percentage of the diameter of the largest wheel (e.g., tire) of the rear wheel assembly 101. Typically, the specified percentage is between about 75 percent and 175 percent. More typically, the specified percentage is between about 90 percent and 110 percent (e.g., about 100 percent).

Figure 6:
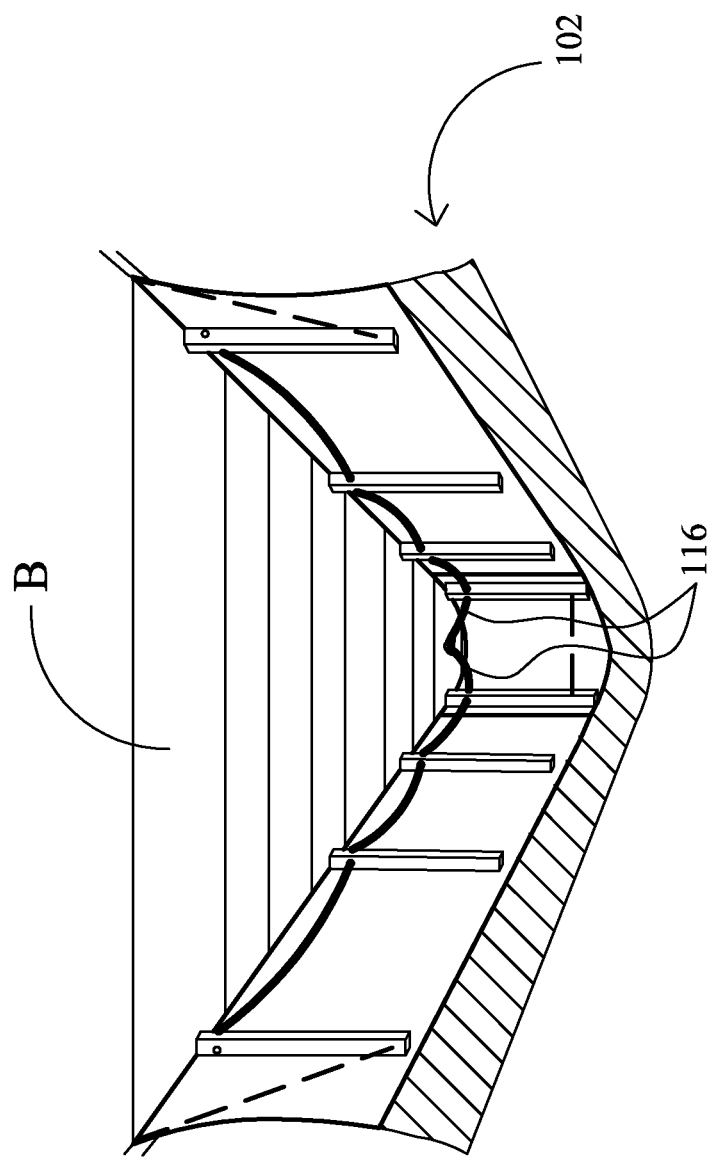
FIG. 6 is a rear perspective view depicting an exemplary apparatus for decreasing aerodynamic drag, improving stability, and reducing road spray of a transport vehicle having a safety tether according to the present invention.

When mounting an aerodynamic add-on device 139 to a transport vehicle 100, there exists a danger that the aerodynamic add-on device 139 could unexpectedly decouple from the transport vehicle 100. This would likely present a significant hazard to surrounding motorists. Referring now to FIG. 6, to minimize this danger, an aspect of the apparatus according to the present invention employs a safety tether 116 (i.e., a tether, a strap, a cable and the like) as a back-up measure. More particularly, the apparatus comprises a safety tether 116 for attaching the underbody fairing 102 to the bottom portion of the transport vehicle 100. The safety tether 116 is secured both to the transport vehicle 100 and to the aerodynamic add-on device 139. In addition, the safety tether 116 may be connected to the mounting means for the aerodynamic add-on device 139.

Figure 7:
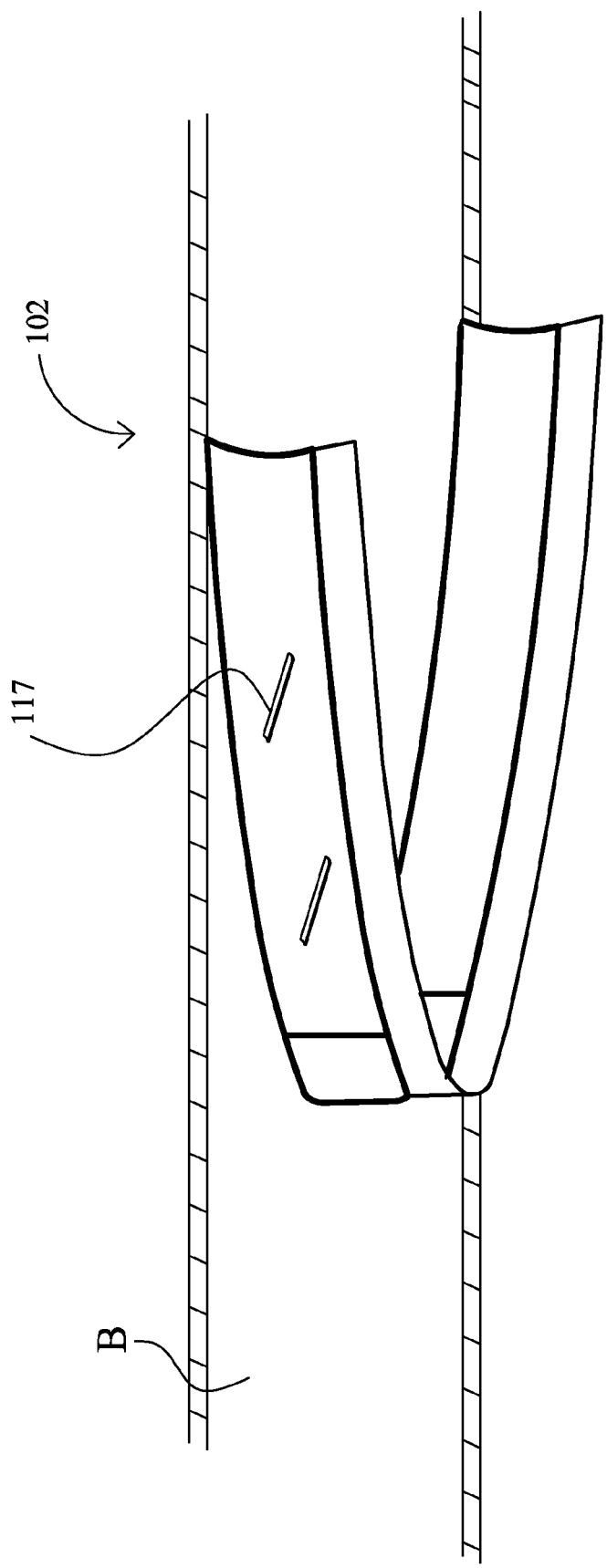
FIG. 7 is a side perspective view depicting an exemplary apparatus for decreasing aerodynamic drag, improving stability, and reducing road spray of a transport vehicle according to the present invention.

Referring now to FIG. 7, in an alternative embodiment, the underbody fairing's substantially parabolic elongated panel 103 may have at least one vortex generator 117 on the first lateral portion 108 and at least one vortex generator 117 on the second lateral portion 110. In a preferred embodiment, the vortex generators 117 have a generally elongated rectangular shape and a rounded first side, and are placed in a non-horizontal manner (e.g., between 10 degrees and 35 degrees from horizontal) along the underbody fairing 102. In one embodiment, the vortex generators 117 may be fixably attached to the underbody fairing 102. In an alternative embodiment, the vortex generators 117 are integral to the underbody fairing 102. The vortex generators 117 are useful in maintaining the laminar flow of air on the downwind side of the transport vehicle 100. The vortex generators 117 provide the additional benefit of deflecting water spray or snow spray in a manner so that it reduces the interference with the visibility of nearby drivers or the rear visibility of the transport vehicle 100 operator.

Figure 8:
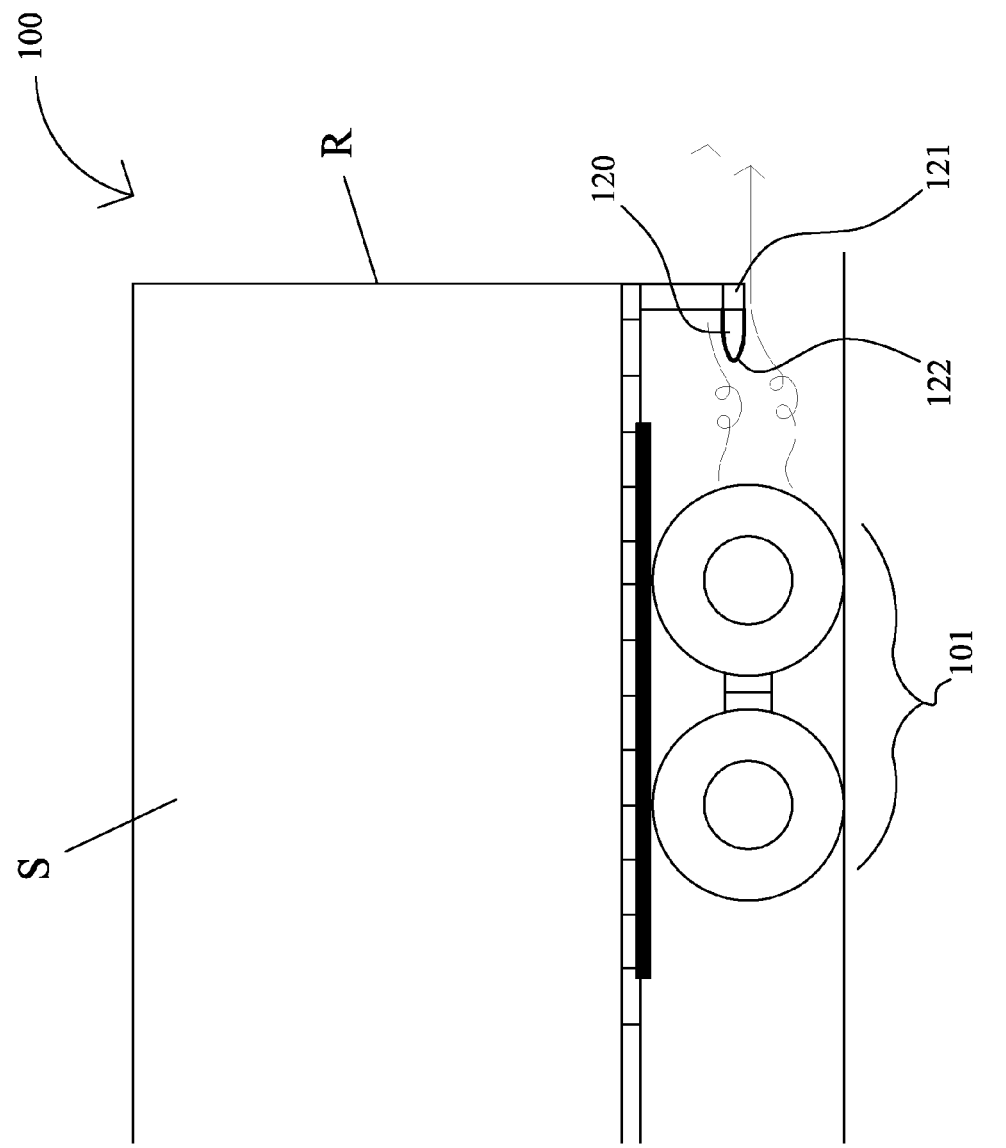
FIG. 8 is a side elevation view depicting the rear portion of an exemplary transport vehicle fitted with an exemplary apparatus for decreasing aerodynamic drag, improving stability, and reducing road spray of a transport vehicle according to the present invention.

Referring now to FIG. 8, in another aspect, the present invention embraces an apparatus for decreasing aerodynamic drag, improving stability, and decreasing road spray of a transport vehicle 100 having a rear bumper bar 121. The apparatus comprises an air straightener 120 for promoting the laminar flow of air over the surfaces of the rear bumper bar 121. The air straightener 120 is adapted to extend forward from the front of the rear bumper bar 121 a distance equal to between one and three times (e.g., about two times) the horizontal width of the rear bumper bar 121. The extended width of the air straightener 120 allows for an improved ability to convert the turbulent airflow approaching the front of the rear bumper bar 121 into a laminar airflow exiting the rear portion of the transport vehicle 100. This, in turn, decreases aerodynamic drag, improves stability, and decreases road spray of the transport vehicle 100.

In one aspect, the air straightener 120 is substantially equal in length to the length of the rear bumper bar 121 and is adapted to extend longitudinally across the front of the rear bumper bar 121. The front side 122 of the air straightener 120 is substantially arcuate, providing a more aerodynamic profile and preventing early airflow separation (i.e., de-lamination or aerodynamic stall).

In a preferred embodiment, the air straightener 120 is mountably attached to the rear bumper bar 121 of a transport vehicle 100. In an alternative embodiment, the air straightener 120 is integral to the rear bumper bar 121 of a transport vehicle 100.

An air straightener 120 of this width provides a sufficient surface area to convert the turbulent airflow contacting the air straightener 120 into laminar airflow. As such, the relatively turbulent air exiting the rear portion of the rear wheel assembly 101 is converted to a relatively more laminar airflow by the air straightener 120. As this laminar airflow exits the rear portion of the transport vehicle 100, it produces less aerodynamic drag. Furthermore, the laminar airflow results in reduced road spray.

Figure 9:
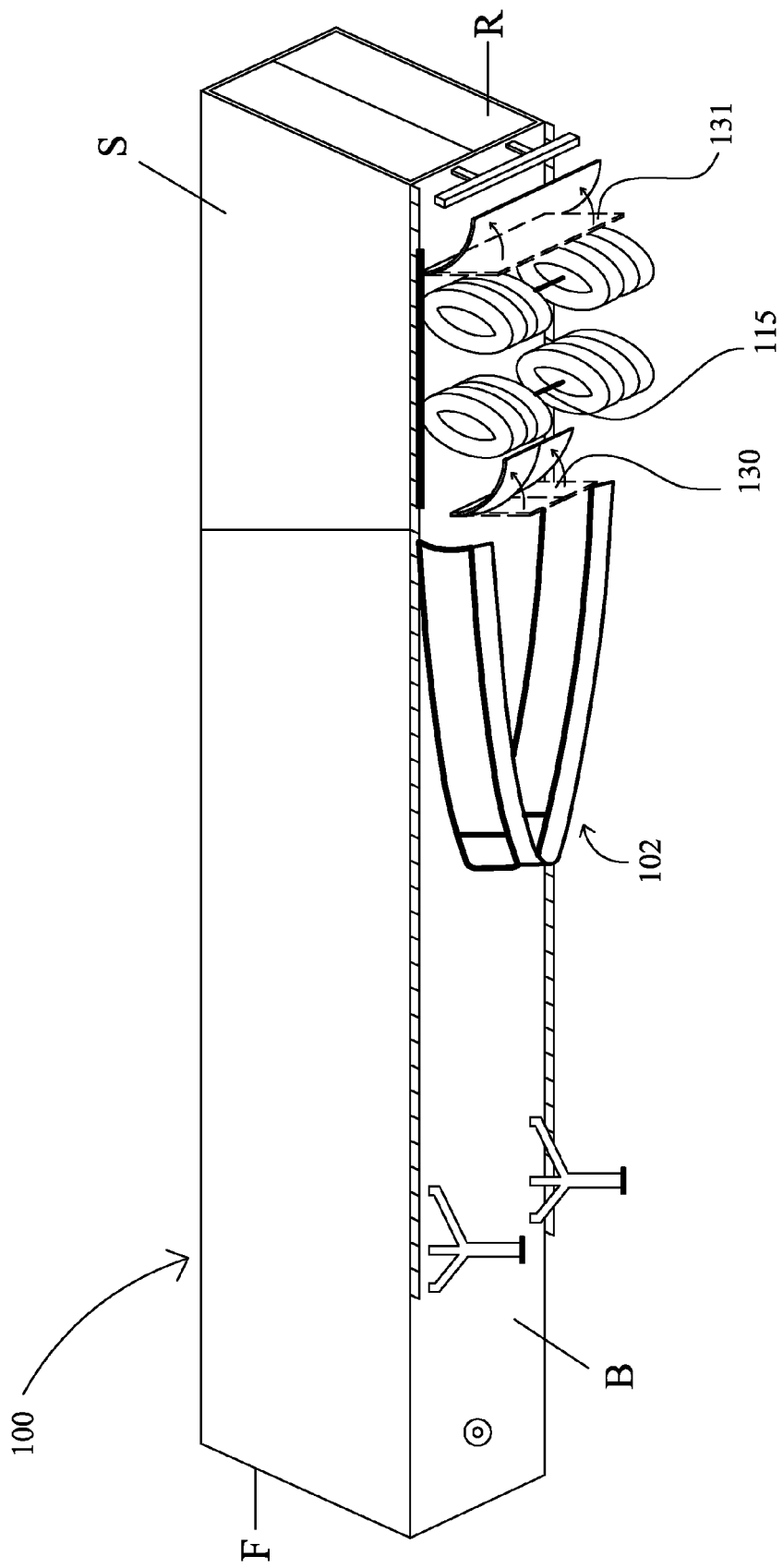
FIG. 9 is a bottom perspective view depicting the trailer portion of an exemplary transport vehicle fitted with an exemplary apparatus for decreasing aerodynamic drag, improving stability, and reducing road spray of a transport vehicle according to the present invention.

Referring now to FIG. 9, in another aspect, the present invention embraces an apparatus for decreasing aerodynamic drag, improving stability, and decreasing road spray of a transport vehicle 100. The apparatus comprises at least one front flap 130 and at least one rear flap 131. The flaps may be similar to traditional mudflaps in size and shape. Typically, the flaps are comprised of a resilient material like rubber or plastic. They are therefore durable and cost-effective. Alternatively, the flaps may be constructed of a substantially rigid material provided the flaps are then hingedly attached to the transport vehicle. The flaps are strategically positioned along the bottom of the transport vehicle 100 to facilitate an increase in the velocity of airflow passing between the rear axles of the rear wheel assembly 101 and the ground, and then out through the rear portion of the transport vehicle 100.

The at least one front flap 130 and the at least one rear flap 131 are attached (e.g., fixably attached or hingedly attached) to a bottom portion of the rear wheel assembly 101. The at least one front flap 130 and at least one rear flap 131 are adapted to deflect rearward under wind loads experienced at highway speeds. As airflow strikes the at least one front flap 130, air is forced downward. The velocity of the airflow increases because it has been forced into a smaller area (i.e., the area between the at least one front flap 130 and the ground). The high velocity airflow passes through the space between the rear wheel assembly 101 axles and the ground, and, upon exiting that space, the airflow encounters the at least one rear flap 131. The at least one rear flap 131 similarly forces the high velocity airflow down, thereby substantially maintaining its velocity as it exits out the rear portion of the transport vehicle 100. In this way, the at least one front flap 130 and at least one rear flap 131 work in combination to maintain a channel of accelerated airflow beneath the rear portion of the transport vehicle 100.

A person of ordinary skill in the art will recognize that the flaps and their associated high velocity airflow bear a resemblance to a venturi. As the resulting high velocity airflow emerges from the rear portion of the transport vehicle 100, it tends to mitigate the negative aerodynamic effects of the area of low pressure immediately behind the transport vehicle 100 (commonly referred to as "base drag"). By reducing the negative impact of base drag on a transport vehicle 100, this stream of high velocity air has the overall effect of reducing aerodynamic drag and increasing fuel-efficiency. In addition, it will be appreciated that the flaps also serve to deflect road spray, thereby obviating the need for traditional mudflaps. This benefit is further appreciated when it is considered that traditional mudflaps have an overall effect of increasing aerodynamic drag and decreasing fuel economy.

In a preferred embodiment, the at least one front flap 130 is positioned within a longitudinal center portion of the transport vehicle 100 adjacent to the front of the rear wheel assembly 101.

In an alternative embodiment, the at least one rear flap 131 comprises a first rear flap positioned behind one end of the rear wheel assembly 101 and a second rear flap positioned behind an opposite end of the rear wheel assembly 101. Alternatively, the at least one rear flap 131 may comprise a unitary flap extending horizontally substantially across the width of the rear wheel assembly 101.

Figure 10:
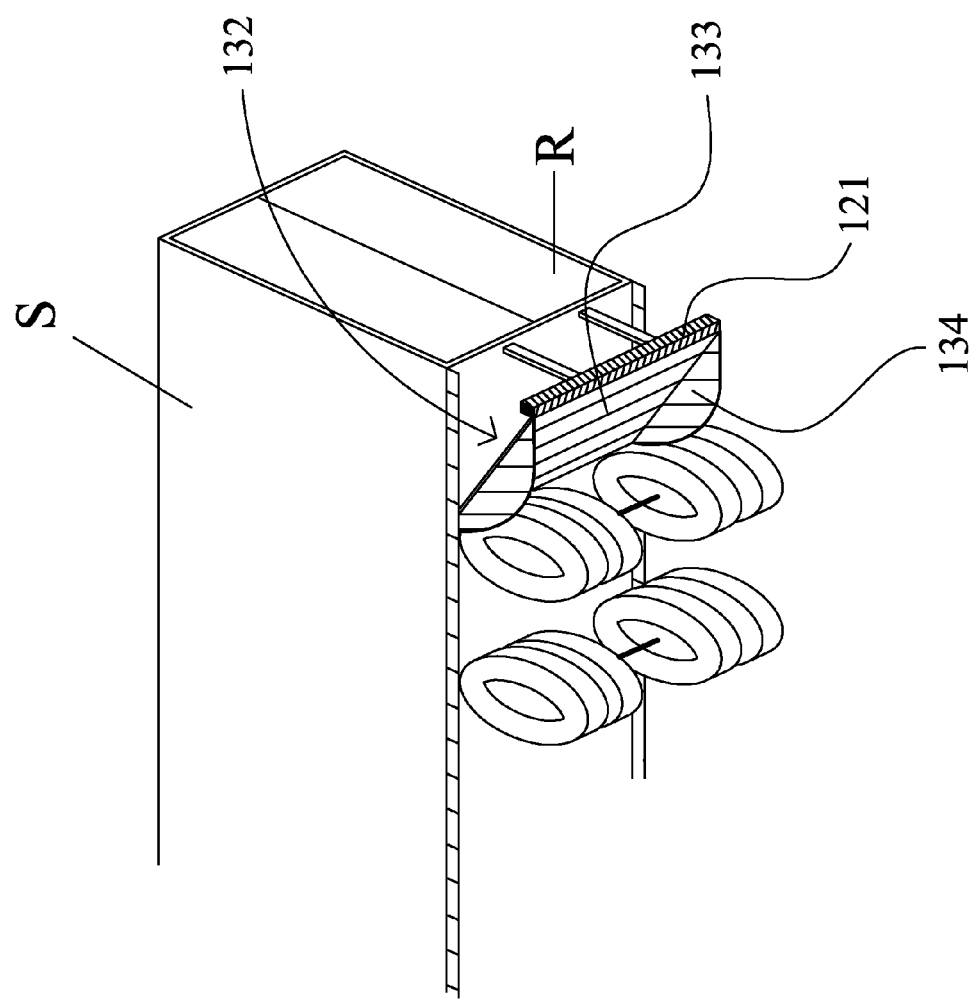
FIG. 10 is a bottom perspective view depicting the rear portion of an exemplary transport vehicle fitted with an exemplary apparatus for decreasing aerodynamic drag, improving stability, and reducing road spray of a transport vehicle according to the present invention.

In another aspect, the invention embraces a tail venturi apparatus for mounting behind the rear wheel assembly of a transport vehicle. Referring to FIG. 10, the tail venturi apparatus 132 comprises an air deflecting member 133 adapted to force airflow exiting the rear wheel assembly 101 downward, and a channel member 134 adapted to prevent air from flowing laterally away from the air deflecting member 133, thereby increasing the velocity of the airflow exiting the rear of the transport vehicle 100. The tail venturi 132 is adapted to attach to a bottom portion of the transport vehicle 100. In a preferred embodiment, the rear portion of the tail venturi 132 is attached to the rear safety bar and the front portion of the tail venturi 132 to the bottom of the transport vehicle 100. The tail venturi 132 according to the present invention facilitates the acceleration of air flowing from the rear of the transport vehicle 100. The resulting high velocity airstream, when ejected from under the rear portion of the transport vehicle 100, has a drag-reducing effect on the area of low pressure immediately behind the rear of the transport vehicle (i.e., base drag), thereby reducing overall aerodynamic drag, improving stability, and reducing road spray of the transport vehicle 100. In an alternative embodiment, the tail venturi does not have a channel member 134.

Figure 11:
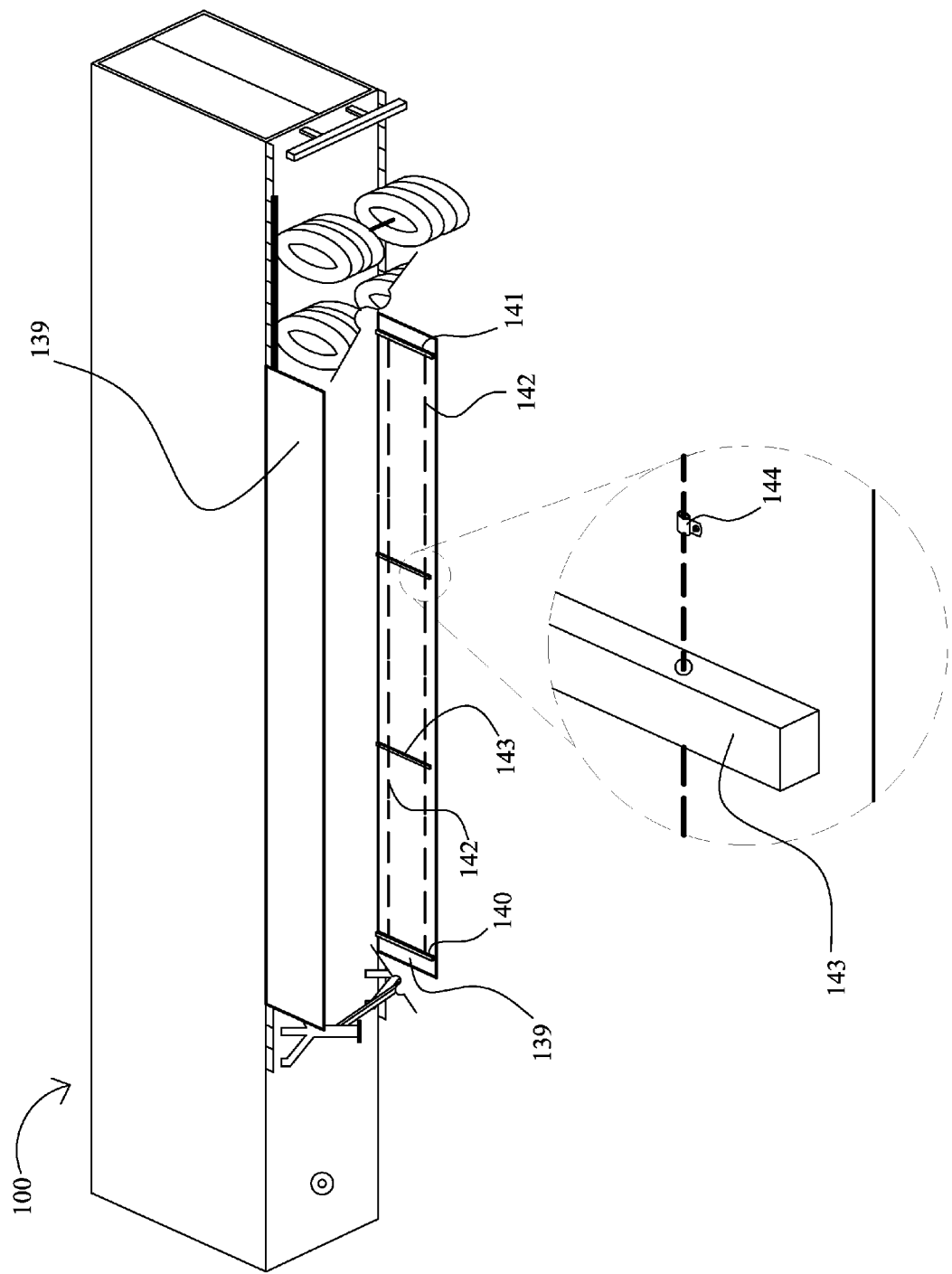
FIG. 11 is a bottom perspective view depicting an exemplary transport vehicle fitted with an exemplary apparatus for mounting an aerodynamic add-on device to a transport vehicle.

Referring now to FIG. 11, in another aspect, the invention embraces an apparatus for mounting an aerodynamic add-on device 139 to a transport vehicle 100. The apparatus comprises a first support post 140 and a second support post 141 for mounting to the bottom portion of the transport vehicle 100. At least one support cable 142 (e.g., steel cable, rope) for mounting to the aerodynamic add-on device 139 is attached at one end to the first support post 140 and at an opposite end to the second support post 141. The apparatus further comprises at least one quick-connect post 143 for mounting both to the aerodynamic add-on device 139 and to the transport vehicle 100. The quick-connect post 143 is adapted to quickly attach at one end to the transport vehicle 100, for example by employing metal pin to engage both an opening defined by the top portion of the quick-connect post 143 and a metal bracket attached to the bottom of the transport vehicle 100. When attached to the transport vehicle 100, the quick-connect post 143 works in conjunction with the first support post 140 and the second support post 141 to support the aerodynamic add-on device 139. The quick-connect posts 143 may be constructed of a resilient material to allow them to flex without damage when encountering a roadway obstacle.

In another aspect, the invention embraces a method of installing an aerodynamic add-on device 139 onto a transport vehicle 100. To install an aerodynamic add-on device 139 onto the bottom of the transport vehicle 100, a first support post 140 and second support post 141 are attached at one end to the transport vehicle 100. These support posts are of sufficient strength to support substantially the entire weight of the aerodynamic device, and serve as the primary attachment points connecting the aerodynamic add-on device 139 to the transport vehicle 100. At least one support cable 142 is secured to a side of the aerodynamic add-on device 139. Typically, the at least one support cable 142 is secured by a plurality of guide sleeves 144 (i.e., cable guides, P-clamps). Consequently, the aerodynamic add-on device 139 is able to move laterally in relation to the at least one support cable 142. At least one quick-connect post 143 is secured to the at least one support cable 142 and substantially perpendicular to a longitudinal axis of the aerodynamic add-on device 139. The at least one quick-connect post 143 is placed in the middle portion of the side of the aerodynamic add-on device 139 so that when the at least one support post is lifted, the weight of the aerodynamic add-on device 139 is relatively evenly distributed along the at least one support cable 142 along on both sides of the at least one quick connect post. To connect the at least one quick-connect post 143 to the at least one support cable 142, the at least one support cable 142 is typically passed through an aperture defined by the at least one quick connect post 143.

The at least one quick-connect post 143 is secured at one end to the transport vehicle 100. In so doing, the weight of the middle portion of the aerodynamic add-on device 139 is supported by the quick-connect post 143 during the remainder of the installation. It will be understood that the implementation of the at least one quick-connect post 143 is desirable because only one person is typically needed to attach the at least one quick-connect post 143 (i.e., one person can support the middle portion of the aerodynamic add-on device 139 with one hand while attaching the quick-connect post 143 to the transport vehicle 100 with the other hand). One end of the at least one support cable 142 is secured to the first support post 140 and an opposite end of the first support cable 142 is attached to the second support post 141. It will be recognized that the at least one support cable 142 is suspended between the first support post 140 and second support post 141, and is supporting the weight of the aerodynamic add-on device 139. The at least one quick-connect post 143 serves to further stabilize both the at least one support cable 142 and the aerodynamic add-on device 139 when they encounter buffeting due to airflow at highway speeds.

As an alternative method of installing an aerodynamic add-on device 139, the at least one support cable 142 may comprise a first support cable and a second support cable. The first support cable is secured longitudinally across an upper portion of the aerodynamic add-on device 139. The second support cable is secured longitudinally across a lower portion of the aerodynamic device. The use of at least two cables provides additional support for the weight of the aerodynamic add-on device 139, as well as additional stability. For example, the use of at least two cables with a side skirt would help prevent the side skirt from deflecting underneath the transport vehicle 100 at highway speeds.

Another advantage of this method of attaching an aerodynamic add-on device to a transport vehicle 100 is that it allows for a certain amount of movement in the aerodynamic device because the aerodynamic add-on device 139 is slidably mounted to the at least one support cable 142. More specifically, it allows for a given aerodynamic device to contract and expand as the ambient temperature fluctuates. This is particularly advantageous because less expensive materials, which are often more apt to expand and contract in temperature variations, can be attached using the present method without damage or loss of aerodynamic function due to changes in shape (e.g. by warping). As the aerodynamic device expands or contracts, it simply slides along the support cables, which allow the aerodynamic device to move while still securing it to the transport vehicle 100.

Yet another advantage of this method of attaching an aerodynamic add-on device to a transport vehicle is that it allows for selectively tensioning the support cables 142. For example, the support cables 142 may be attached to the support posts using eye bolts and nuts. The tension of the support cables may be adjusted by turning the nut. A specific tension may be selected by designating a selected torque setting for the nut.

Figure 12:
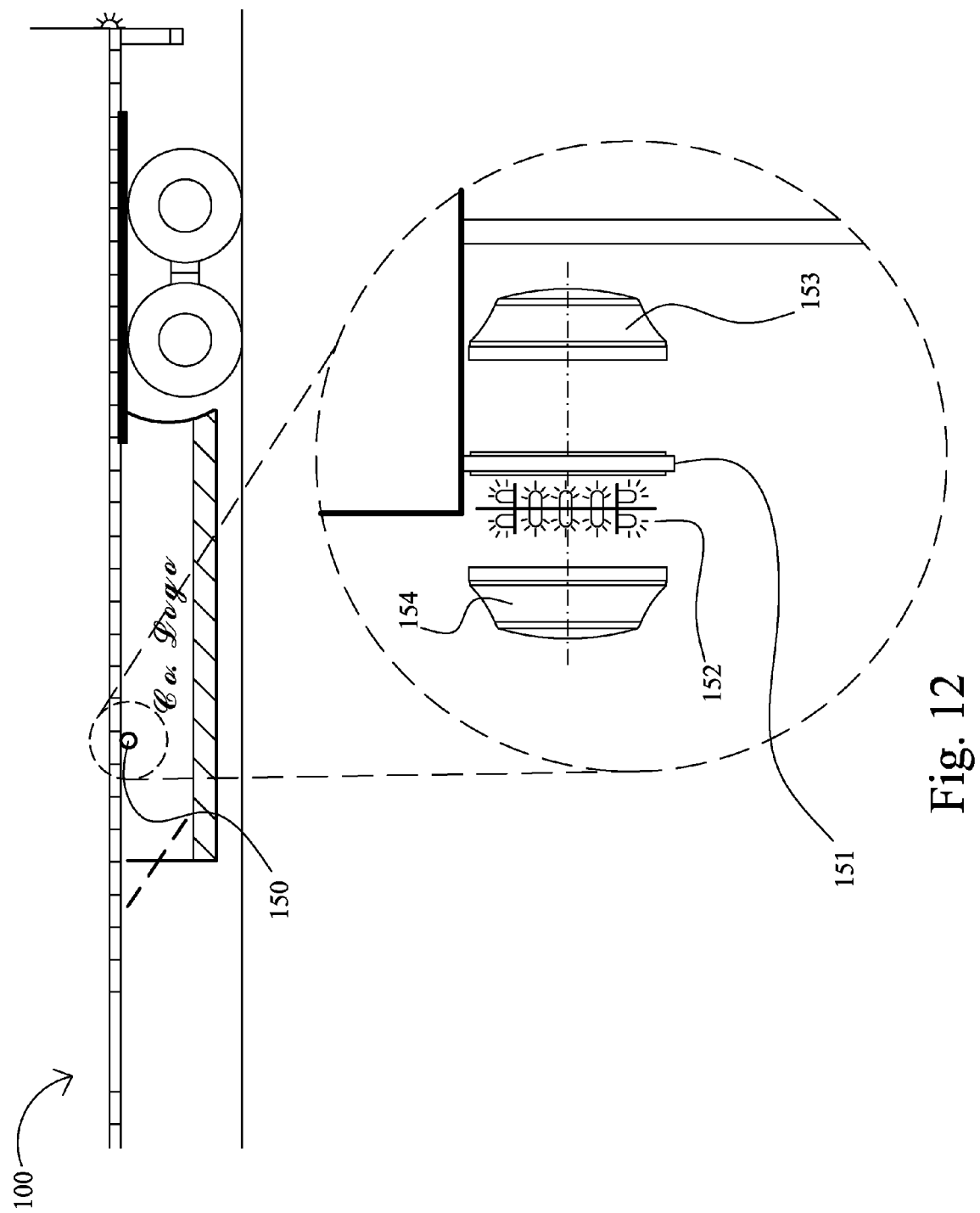
FIG. 12 is a side view depicting a portion of an exemplary transport vehicle featuring an exemplary side marker lamp according to the present invention, with the side marker lamp shown in an exploded view.

Turning now to FIG. 12, in another aspect, the present invention embraces a side marker lamp 150 for illuminating an aerodynamic add-on device 139 mounted on the underbody of a transport vehicle 100. The side marker lamp 150 comprises a rigid housing 151 for attachment to a side portion of the transport vehicle 100. The housing 151 has a first side and a second side. The second side of the housing 151 opposes the first side. A light source 152 is positioned inside the housing 151. The side marker lamp 150 employs a first lens 153 configured to receive light from the light source 152 and project the light away from the first side of the housing 151. The first lens 153 is attached to the first side of the housing 151. When positioned on the transport vehicle 100, the light projected from this first lens 153 signals a boundary of the transport vehicle 100 in accordance with the traditional function of a side marker lamp 150.

A second lens 154 is attached to the second side of the housing 151. The second lens 154 is configured to receive light from the light source 152 and project the light beneath the transport vehicle 100. When attached to a transport vehicle 100 and connected to a power source (e.g., the transport vehicle 100's electrical system), the light being projected from the second lens 154 side marker lamp 150 according to the present invention may be used to illuminate an underbody add-on device. This may be desirable to increase the overall visibility of the transport vehicle 100 (e.g., for safety) or to illuminate insignia (e.g., company name and/or logo, advertising) on the underbody add-on device. The side marker lamp 150 according to the present invention allows for the illumination of the aerodynamic add-on device 139 without the need for having both a traditional side marker lamp 150 and a spotlight-type lamp, which results in decreased costs. Alternatively, the underbody fairing may be illuminated by a separate spotlight connected to the same power source that powers the side marker lamps of the transport vehicle.

In still another aspect, the invention embraces a method of verifying inspection of aerodynamic add-on devices 139 mounted onto a transport vehicle. According to the method of the present invention, a radio frequency identification (RFID) tag is attached to each aerodynamic device to be inspected. The tag may be either active or passive. The transport vehicle is inspected while equipped with a mobile radio frequency device reader. The mobile radio frequency device reader is adapted to first detect when the mobile radio frequency device reader is in close proximity (i.e., a distance not more than is sufficient allow a person to achieve a satisfactory visual and/or tactile inspection of the aerodynamic add-on device), and then generate a log of the time and date when the inspection occurred. The mobile radio frequency reader log is then reviewed to verify that each aerodynamic add-on device was inspected.

Figure 13:
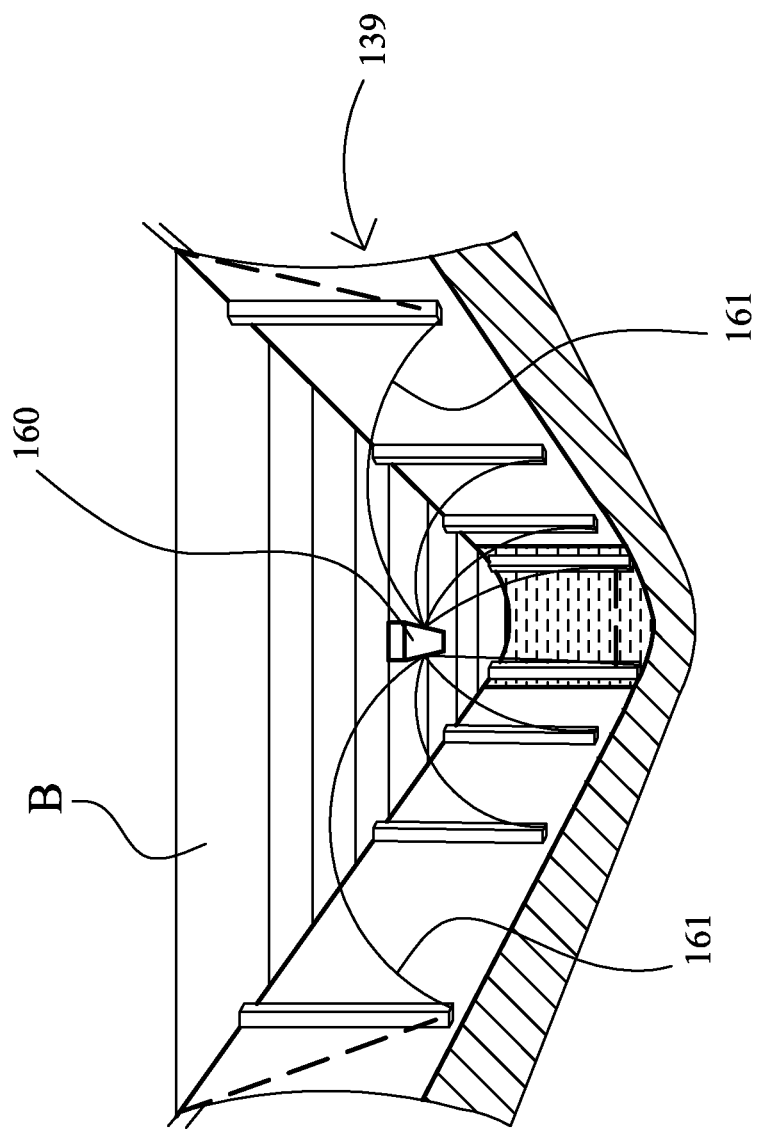
FIG. 13 is a rear perspective view depicting an exemplary system for monitoring the integrity of the connection between an aerodynamic add-on device having a mounting means and a transport vehicle.
Figure 14:
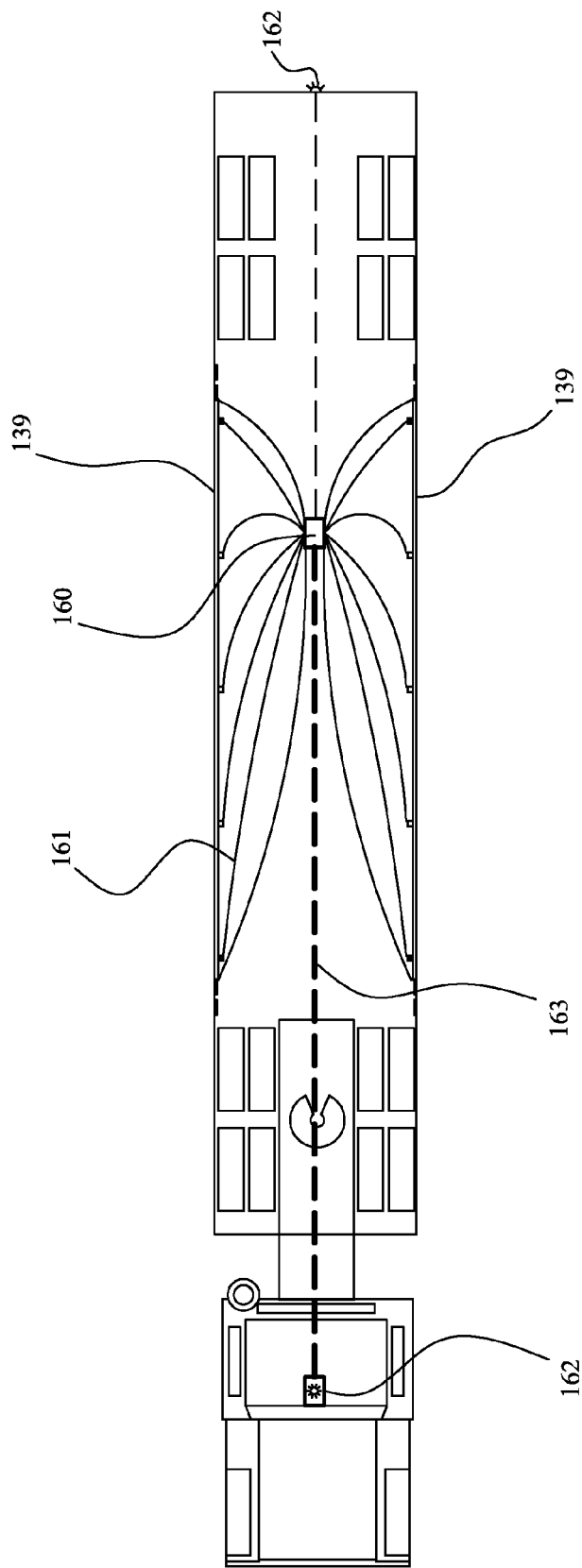
FIG. 14 is a bottom elevation view depicting an exemplary transport vehicle fitted with an exemplary system for monitoring the integrity of the connection between an aerodynamic add-on device having a mounting means and a transport vehicle.

Turning now to FIGS. 13-14, in still another aspect, the invention embraces a system for monitoring the integrity of the connection between an aerodynamic add-on device 139 having a mounting means and a transport vehicle 100. The system comprises an electronic monitoring device 160 adapted to detect a loss of continuity in a ground wire 161. The electronic monitoring device 160 is connected to a ground wire 161 at one end. The ground wire 161 is connected at the opposite end to the mounting means. The system further comprises a warning indicator 162 for alerting the transport vehicle 100 operator that the electronic monitoring device 160 has detected a disconnection of the mounting means from the transport vehicle 100. When the mounting means separates from the body of the transport vehicle 100 (due to a loosening of a bolt, for example), the ground connection between the mounting means and the transport vehicle becomes open or intermittent. The electronic monitoring device 160 detects this abnormality in the ground connection via the ground wire 161, and transmits a signal to activate the warning indicator 162. The system further comprises a transmission means 163 for transmitting an alarm signal from the electronic monitoring device 160 to the warning indicator 162. The warning indicator 162 may be a visual indicator, an aural indicator (e.g., a buzzer) or both. In a preferred embodiment, the transmission means 163 comprises a wire or cable connecting the electronic monitoring device 160 to the warning indicator 162. For example, the transmission means 163 may be a power line carrier (i.e., PLC) under SAE J2497, a bi-directional communication data bus between a tractor and trailer that shares diagnostic and vehicle data (e.g., vehicle speed). The information distributed through the PLC, such as vehicle speed, can be used to determine the appropriate state (e.g., raised or lowered) of a particular aerodynamic device mounted to the transport vehicle to prevent damage, optimize fuel economy, or reduce road spray.

In another aspect, the invention embraces a method of mounting a spare tire carrier having a vertical axis onto a transport vehicle to decrease aerodynamic drag, improve stability, and reduce road spray. In particular, the method comprises the steps of mounting the spare tire carrier to the bottom of a transport vehicle such that the vertical axis of the spare tire carrier passes through a point that is both on the longitudinal centerline of the transport vehicle and that is a horizontal distance from the most forward axle of the rear wheel assembly, said horizontal distance being equal to a specified percentage of the inside wheelbase. Typically, the specified percentage is between 30 percent and 50 percent. More typically, the specified percentage is between 42 percent and 48 percent (e.g., about 45 percent). The method also comprises the step of positioning a spare tire in the spare tire carrier. When positioned in this way, the spare tire acts in a similar fashion to the vertex portion of the underbody fairing described herein. Surprisingly, a transport vehicle with a spare tire carrier mounted in this way results in less aerodynamic drag than a transport vehicle with no spare tire carrier mounted on the bottom of the transport vehicle.

Providing a spare tire carrier having a front side, said front side being adapted to deflect airflow around the rear wheel assembly of the transport vehicle.

In another aspect, the invention embraces a spare tire carrier for a transport vehicle comprising a housing for at least one spare tire and a front air deflector for deflecting airflow around the housing and around the rear wheel assembly of the transport vehicle. The front air deflector is attached to the front portion of the housing. The front air deflector may be integral to the spare tire carrier.

In another aspect, the invention embraces a transport vehicle having decreased aerodynamic drag, increased stability, and reduced road spray, the transport vehicle comprising a transport vehicle equipped with the aerodynamic add-on devices disclosed herein.

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

What is claimed is:

1. An apparatus for decreasing aerodynamic drag, improving stability, and decreasing road spray of a transport vehicle, comprising:
    an underbody fairing for mounting to a bottom portion of a transport trailer forward of the rear wheel assembly, said underbody fairing comprising a substantially parabolic elongated panel having a first edge portion, a second edge portion, a first lateral portion and a second lateral portion, and a vertex portion, said vertex portion being substantially arcuate;
    wherein the shortest distance between (i) the intersection of said vertex portion with said first lateral portion and (ii) the intersection of said vertex portion with said second lateral portion is between twenty percent and fifty percent of the shortest distance between (i) said first edge portion and (ii) said second edge portion;
    whereby said underbody fairing diverts airflow around the rear wheel assembly of the transport vehicle while facilitating the laminar flow of crosswind beneath the transport vehicle, thereby decreasing aerodynamic drag, improving stability, and decreasing road spray of the transport vehicle.

2. The apparatus of claim 1 wherein said vertex portion defines a portion of a circle having a radius equal in length to a specified percentage of the width of the transport vehicle.

3. The apparatus of claim 2 wherein the specified percentage is between 5 percent and 25 percent.

4. The apparatus of claim 2 wherein the specified percentage is between 10 percent and 20 percent.

5. The apparatus of claim 2 wherein the specified percentage is between 14 percent and 18 percent.

6. The apparatus of claim 2 wherein the specified percentage is 16 percent.

7. The apparatus of claim 1 wherein said underbody fairing is positioned substantially perpendicular to the bottom of the transport vehicle.

8. The apparatus of claim 1 wherein said underbody fairing extends from the bottom of the transport vehicle a vertical distance that is a specified percentage of the distance from the bottom of the transport vehicle to the ground.

9. The apparatus of claim 8 wherein the specified percentage is between 65 percent and 85 percent.

10. The apparatus of claim 8 wherein the specified percentage is about 77 percent.

11. The apparatus of claim 1 wherein said first lateral portion and said second lateral portion are substantially straight.

12. The apparatus of claim 1 wherein said first lateral portion and said second lateral portion are substantially arcuate.

13. The apparatus of claim 1 wherein the horizontal length of said underbody fairing is equal to a specified percentage of the inside wheelbase of the transport vehicle.

14. The apparatus of claim 13 wherein said specified percentage is between 18 percent and 58 percent.

15. The apparatus of claim 13 wherein said specified percentage is between 28 percent and 48 percent.

16. The apparatus of claim 13 wherein said specified percentage is about 38 percent.

17. The apparatus of claim 1 wherein said substantially parabolic elongated panel has a substantially resilient lower portion.

18. The apparatus of claim 1 wherein said substantially parabolic elongated panel has a substantially resilient upper portion, and wherein said resilient upper portion will, when the underbody fairing is installed on a transport vehicle, bend to form an outwardly-bending curve that substantially blocks the flow of air between the underbody fairing and the bottom of the transport vehicle when the transport vehicle is in a forward motion.

19. The apparatus of claim 1 wherein said substantially parabolic elongated panel has a substantially rigid middle portion.

20. The apparatus of claim 1 wherein:
    said vertex portion is positioned adjacent to the bottom of the transport vehicle and substantially along a longitudinal centerline of the transport vehicle and forward of said first edge portion and said second edge portion;
    said first edge portion is positioned substantially adjacent to an intersection of the bottom of the transport vehicle and one side of the transport vehicle; and
    said second edge portion is positioned substantially adjacent to an intersection of the bottom of the transport vehicle and an opposite side of the transport vehicle.

21. The apparatus of claim 20 wherein said first edge portion and said second edge portion are each further positioned substantially adjacent to the front portion of the rear wheel assembly.

22. The apparatus of claim 20 wherein said first edge portion and said second edge portion are each further positioned a horizontal distance from the most forward axle of the rear wheel assembly, said horizontal distance being equal to a specified percentage of the diameter of the largest wheel of the rear wheel assembly.

23. The apparatus of claim 22 wherein the specified percentage is between 75 percent and 175 percent.

24. The apparatus of claim 22 wherein the specified percentage is between 90 percent and 110 percent.

25. The apparatus of claim 22 wherein the specified percentage is about 100 percent.

26. An apparatus for decreasing aerodynamic drag, improving stability, and decreasing road spray of a transport vehicle, comprising:
    an underbody fairing for mounting to a bottom portion of a transport trailer forward of the rear wheel assembly, said underbody fairing comprising a substantially parabolic elongated panel having a first edge portion, a second edge portion, a first lateral portion and a second lateral portion, and a vertex portion, said vertex portion being substantially arcuate, the forwardmost 90 degrees of arc of the curve of said vertex having a radius that is equal to between 5 percent and 25 percent of the shortest distance between the first edge portion and the second edge portion;

whereby said underbody fairing diverts airflow around the rear wheel assembly of the transport vehicle while facilitating the laminar flow of crosswind beneath the transport vehicle, thereby decreasing aerodynamic drag, improving stability, and decreasing road spray of the transport vehicle.

27. An apparatus for decreasing aerodynamic drag, improving stability, and decreasing road spray of a transport vehicle, comprising:

an underbody fairing for mounting to a bottom portion of a transport trailer forward of the rear wheel assembly, said underbody fairing comprising a substantially parabolic elongated panel having a first edge portion, a second edge portion, a first lateral portion and a second lateral portion, and a vertex portion;

wherein said substantially parabolic elongated panel has a substantially resilient upper portion.

28. The apparatus of claim 27, wherein said resilient upper portion will, when the underbody fairing is installed on a transport vehicle, bend to form an outwardly-bending curve that substantially blocks the flow of air between the underbody fairing and the bottom of the transport vehicle when the transport vehicle is in a forward motion.

\* \* \* \* \*